(12) United States Patent
Kimura et al.

(10) Patent No.: US 8,325,185 B2
(45) Date of Patent: Dec. 4, 2012

(54) COMPUTER-READABLE RECORDING MEDIUM WHICH STORES RENDERING PROGRAM, RENDERING APPARATUS AND RENDERING METHOD

(75) Inventors: Ryou Kimura, Osaka (JP); Takayuki Arai, Nagoya (JP); Yasuharu Kase, Nagoya (JP); Kiyoshi Kawarazaki, Anjo (JP)

(73) Assignees: Digital Fashion Ltd. (JP); Toyota Tsusho Corporation (JP)

( * ) Notice: Subject to any disclaimer, the term of this patent is extended or adjusted under 35 U.S.C. 154(b) by 842 days.

(21) Appl. No.: 12/312,700

(22) PCT Filed: Nov. 20, 2007

(86) PCT No.: PCT/JP2007/072474
§ 371 (c)(1),
(2), (4) Date: May 21, 2009

(87) PCT Pub. No.: WO2008/062798
PCT Pub. Date: May 29, 2008

(65) Prior Publication Data
US 2009/0289940 A1    Nov. 26, 2009

(30) Foreign Application Priority Data
Nov. 22, 2006   (JP) ................. 2006-316205

(51) Int. Cl.
*G06T 15/50* (2011.01)
(52) U.S. Cl. ........ 345/426; 345/419; 345/420; 345/424; 345/427; 345/581; 345/582; 345/589
(58) Field of Classification Search .................. 345/419, 345/420, 424, 426, 427, 581, 582, 589; 358/518
See application file for complete search history.

(56) References Cited

U.S. PATENT DOCUMENTS
5,488,700 A * 1/1996 Glassner ...................... 345/426
(Continued)

FOREIGN PATENT DOCUMENTS
JP    2003-36449    2/2003
(Continued)

OTHER PUBLICATIONS

Sato et al. "Object Shape and Reflectance Modeling from Observation", Published 2001.*

(Continued)

*Primary Examiner* — Kimbinh T Nguyen
(74) *Attorney, Agent, or Firm* — Gerald E. Hespos; Michael J. Porco

(57) ABSTRACT

To provide a rendering program, a rendering apparatus, and a rendering method, which are capable of displaying a sterical model surface using a fabric in which the real feel of material is reproduced. A reflection property measurement device 10 receives reflected light of an actual yarn T2 and measures a reflection property representing the energy of the reflected light of the yarn T2. A correction portion 106 calculates a specular reflection coefficient $K_s$, a glossiness coefficient p, and first and second diffuse reflection coefficients $K_{d1}$, $K_{d2}$ by using parameter fitting so that the error between the reflection property of the actual yarn and the energy of the reflected light obtained from a reflection function becomes minimum. A rendering portion 107 renders the sterical model by using the reflection function in which the coefficients are calculated and a texture which is the model of a fabric subjected to a napping treatment.

8 Claims, 20 Drawing Sheets

U.S. PATENT DOCUMENTS

| | | | | |
|---|---|---|---|---|
| 5,704,024 | A * | 12/1997 | Voorhies et al. | 345/426 |
| 6,803,910 | B2 * | 10/2004 | Pfister et al. | 345/420 |
| 6,903,738 | B2 * | 6/2005 | Pfister et al. | 345/420 |
| 7,196,849 | B2 * | 3/2007 | McGuire et al. | 359/630 |
| 7,206,133 | B2 * | 4/2007 | Cassarly et al. | 359/630 |
| 7,256,781 | B2 * | 8/2007 | Shioya | 345/426 |
| 7,360,899 | B2 * | 4/2008 | McGuire et al. | 353/20 |
| 7,450,310 | B2 * | 11/2008 | McGuire | 359/630 |
| 7,536,047 | B2 * | 5/2009 | Borshukov et al. | 382/154 |
| 7,689,035 | B2 * | 3/2010 | Mallick et al. | 382/163 |
| 2004/0070565 | A1 * | 4/2004 | Nayar et al. | 345/156 |
| 2005/0174348 | A1 | 8/2005 | Sakaguchi et al. | |

FOREIGN PATENT DOCUMENTS

| | | |
|---|---|---|
| JP | 2004-152015 | 5/2004 |
| JP | 2007-26049 | 2/2007 |

OTHER PUBLICATIONS

Kautz "Approximate Bidirectional Texture Functions", Published 2005.*

Ogata et al.,—"Computer-aided Industrial Design Support System for Cuticle Material Used in Car Seats"—The Journal of the Institute of Image Information and Television Engineers, Apr. 1, 2006, vol. 60, No. 4, pp. 637-640.

Takeda et al.,—"Image-based modeling of the Micro Surface Geometry of Woven Fabrics based on the Reflectance Analysis"—IPSI SIG Technical Report, Jul. 11, 2006, vol. 2006, No. 76, pp. 7-12.

Ashikmin et al.,—"A Microfacet-based BRDF Generator"—Proceedings of the 27th annual conference on Computer graphics and interactive techniques, 2000, p. 65-74.

Chen et al.,—"Realistic Rendering and Animation of Knitwear"—Transactions on Visualization and Computer Graphics, Mar. 2003, vol. 9, Issue 1, p. 43-55.

"Rendering Fur With Three Dimensional Textures"—James T. Kajiya et al., proceedings of SIGGRAPH (1989).

Jinhua Yang et al., "A Rendering Method for Woven Clothes Reflections"—Joho Shori Gakkai Kenkyuu Houkoku, Joho Shori Gakkai, JP, vol. 2003, No. 88, Jan. 1, 2003, pp. 33-40, XP007910128.

Ward G J, "Measuring and Modeling Anisotropic Reflection"—Jul. 26, 1992, Computer Graphics, ACM, US, pp. 265-272, XPoo2255102.

Addy Ngan et al., "Experimental analysis of BRDF models"—Eurographics Symposium on Rendering, 2005, Jan. 1, 2005, pp. 117-226, XP007910123.

* cited by examiner

FIBER CROSS SECTION

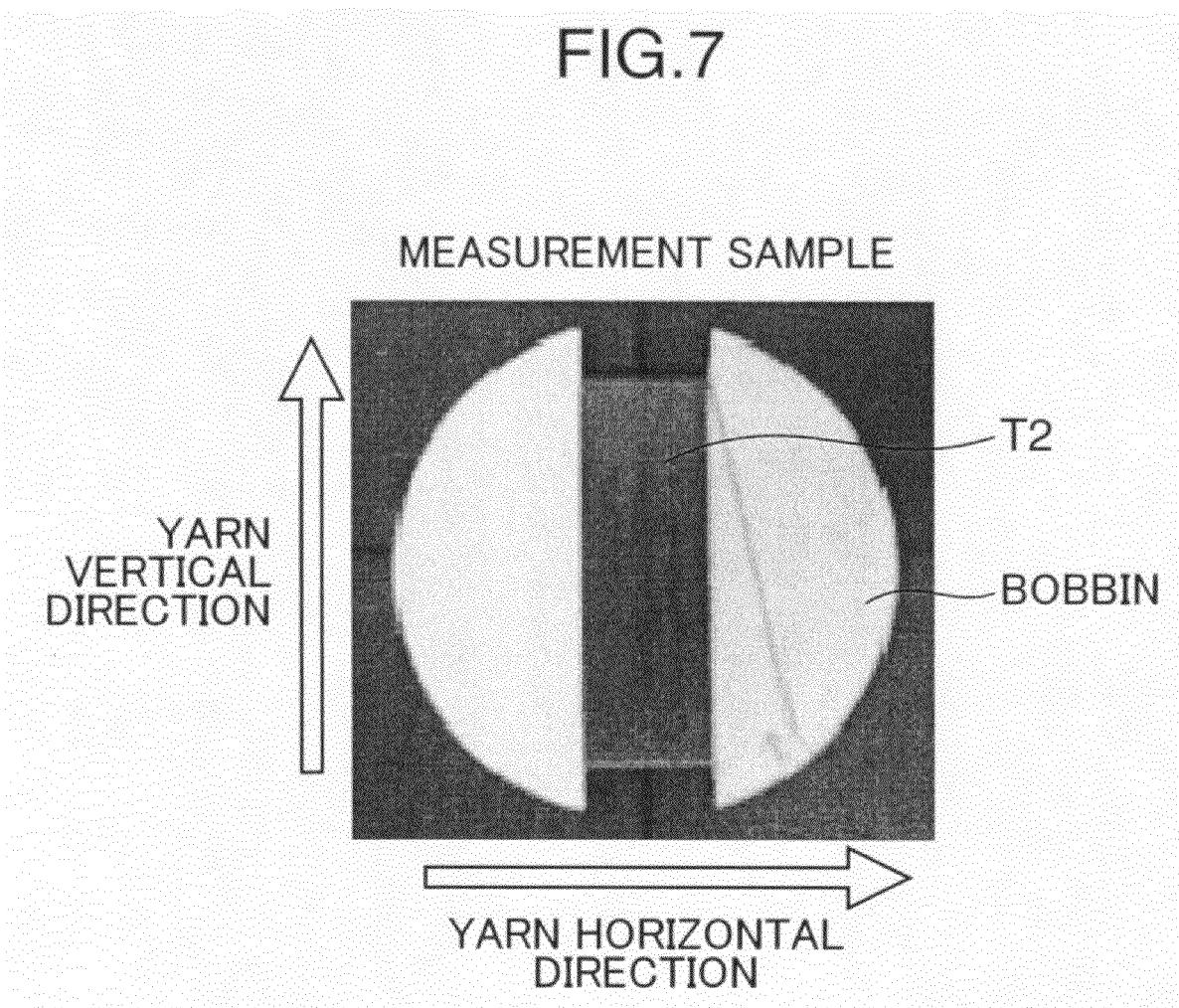

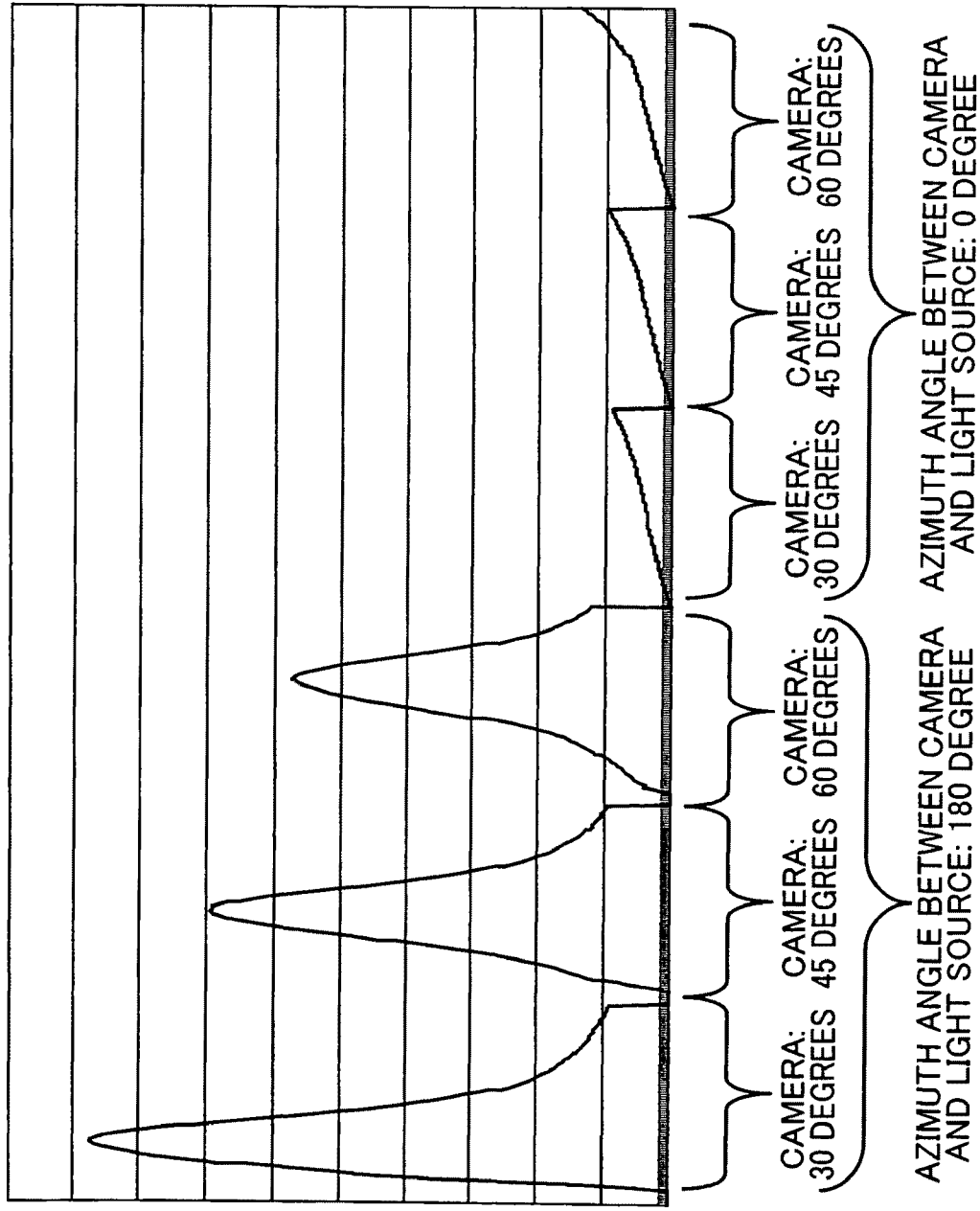

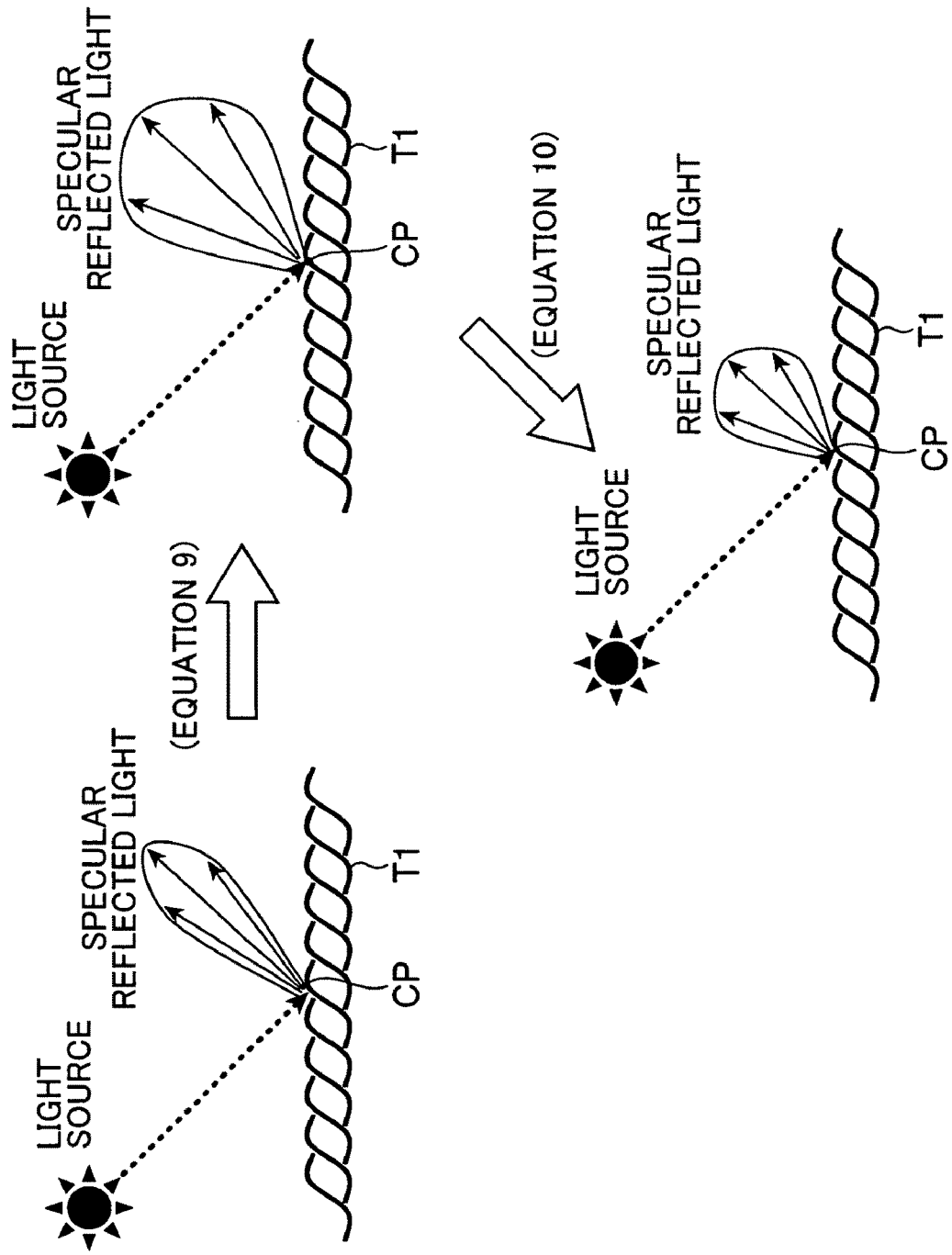

PERTURBATION REGION

COMPUTER-READABLE RECORDING MEDIUM WHICH STORES RENDERING PROGRAM, RENDERING APPARATUS AND RENDERING METHOD

BACKGROUND OF THE INVENTION

1. Field of the Invention

The present invention relates to a rendering program, a rendering apparatus, and a rendering method for attaching a texture of a fabric to a sterical model created beforehand in a virtual three-dimensional space and rendering the sterical model.

2. Description of the Related Art

In the field of computer graphics, rendering of a sterical model by using a reflection function defining a relationship of a ray direction and eye direction to reflected light is generally known. Here, Kajiya-Kay model has been known as a reflection function of a fur (see J, Kajiya, T. Kay, "Rendering fur with three dimensional textures," proceedings of SIGGRAPH (1989)).

Equations (A) to (C) represent Kajiya-Kay model. Furthermore, FIG. 20 is a diagram for explaining Kajiya-Kay model.

$$I = I_s + I_d \tag{A}$$

$$I_s = K_s \cdot S \cdot \cos^P[\mathrm{acos}\{L^*(-T)\} - \mathrm{acos}(V^*T)] \tag{B}$$

$$I_d = K_d \cdot \sin(\mathrm{acos}(L+T)) \tag{C}$$

I: Energy of reflected light
$I_s$: Energy of a specular reflection component of the reflected light
$I_d$: Energy of a diffuse reflection component of the reflected light
P: Coefficient representing the spread of the reflected light
$K_s$: Coefficient for controlling the energy of the specular reflection component
$K_d$: Coefficient for controlling the energy of the diffuse reflection component
L: Unit vector representing a ray direction
V: Unit vector representing a direction of a visual point
T: Unit vector representing a fiber direction In Kajiya-Kay model, therefore, the energy of reflected light can be obtained by setting the eye direction, fiber direction, ray direction and the like.

In Kajiya-Kay model, however, because the coefficients $K_s$, $K_d$ are not defined based on the reflection property of an actual yarn that is obtained by changing the light source and eye direction and measuring the reflected light of the yarn, it was difficult to reproduce the quality of the yarn realistically. Moreover, since Kajiya-Kay model is used in furs or other fabric made of napped long fibers, it was difficult to reproduce a realistic material of a napped fabric.

SUMMARY OF THE INVENTION

An object of the present invention is to provide a rendering program, a rendering apparatus and a rendering method that are capable of displaying a fabric in which the real feel of material of the surface of a sterical material is reproduced.

A computer-readable recording medium which stores rendering program according to the present invention is a rendering program for rendering a sterical model that is created beforehand in a virtual three-dimensional space, the program causing a computer to function as: a model acquisition portion for acquiring the sterical model; a texture acquisition portion for acquiring a texture of a fabric which includes height information representing the shape of a surface of the fabric and fiber direction information indicating a fiber direction of a yarn configuring the fabric, and which is attached to a surface of the sterical model; a rendering portion for rendering the sterical model by using the texture and a reflection function expressing an energy of reflected light of the yarn that corresponds to a ray direction, an eye direction and the fiber direction represented by the fiber direction information, the directions being in the virtual three-dimensional space; a reflection property acquisition portion for acquiring a reflection property of an actual yarn that is obtained by measuring an energy of reflected light of the actual yarn after changing the ray direction and the eye direction; and a correction portion for correcting the reflection function so that an error between the reflection property acquired by the reflection property acquisition portion and the energy of the reflected light obtained from the reflection function becomes minimum, wherein the rendering portion renders the sterical model by using the reflection function corrected by the correction means.

A rendering apparatus according to the present invention is a rendering apparatus for rendering a sterical model that is created beforehand in a virtual three-dimensional space, the apparatus having: a model acquisition portion for acquiring the sterical model; a texture acquisition portion for acquiring a texture of a fabric which includes height information representing the shape of a surface of the fabric and fiber direction information indicating a fiber direction of a yarn configuring the fabric, and which is attached to a surface of the sterical model; a rendering portion for rendering the sterical model by using the texture and a reflection function expressing an energy of reflected light of the yarn that corresponds to a ray direction, an eye direction and the fiber direction information in the virtual three-dimensional space; a reflection property acquisition portion for acquiring a reflection property of an actual yarn that is obtained by measuring an energy of reflected light of the actual yarn after changing the ray direction and the eye direction; and a correction portion for correcting the reflection function so that an error between the reflection property acquired by the reflection property acquisition portion and the energy of the reflected light of the yarn obtained from the reflection function becomes minimum, wherein the rendering portion renders the sterical model by using the reflection function corrected by the correction portion.

A rendering method according to the present invention is a rendering method for rendering a sterical model that is created beforehand in a virtual three-dimensional space, the method having: a step in which a computer acquires the sterical model; a step in which the computer acquires a texture of a fabric which includes height information representing the shape of a surface of the fabric and fiber direction information indicating a fiber direction of a yarn configuring the fabric, and which is attached to a surface of the sterical model; a step in which the computer renders the sterical model by using the texture and a reflection function expressing an energy of reflected light of the yarn that corresponds to a ray direction, an eye direction and the fiber direction information in the virtual three-dimensional space; a step in which the computer acquires a reflection property of an actual yarn that is obtained by measuring an energy of reflected light of the actual yarn after changing the ray direction and the eye direction; and a step in which the computer corrects the reflection function so that an error between the reflection property and the energy of the reflected light obtained from the reflection function becomes minimum, wherein the rendering step renders the sterical model by using the reflection function corrected.

According to these configurations, the reflection property of an actual yarn that is obtained by changing the ray direction and eye direction and measuring the reflected light of the yarn is acquired, the reflection function is corrected so that the error between the acquired reflection property and the energy of the reflected light obtained from the reflection function of the yarn becomes minimum, and the sterical model is rendered by using the corrected reflection function and the texture of the fabric. Consequently, the reflection function can realistically display the reflection property of the real yarn, whereby the surface of the sterical model can be displayed by the fabric in which the material thereof is reproduced realistically.

BRIEF DESCRIPTION OF THE DRAWINGS

FIG. 7 is a diagram showing an actual yarn T2 placed on a specimen loading table;

FIG. 9 is a graph showing a reflection property of the yarn measured by the reflection property measurement device, wherein the vertical axis represents the energy, and the horizontal axis represents the azimuth angle and the elevation angles of the camera and the light source;

FIG. 15 is a diagram descriptive of a step of calculating the spread of glossiness;

DETAILED DESCRIPTION OF THE PREFERRED EMBODIMENTS

Figure 1:
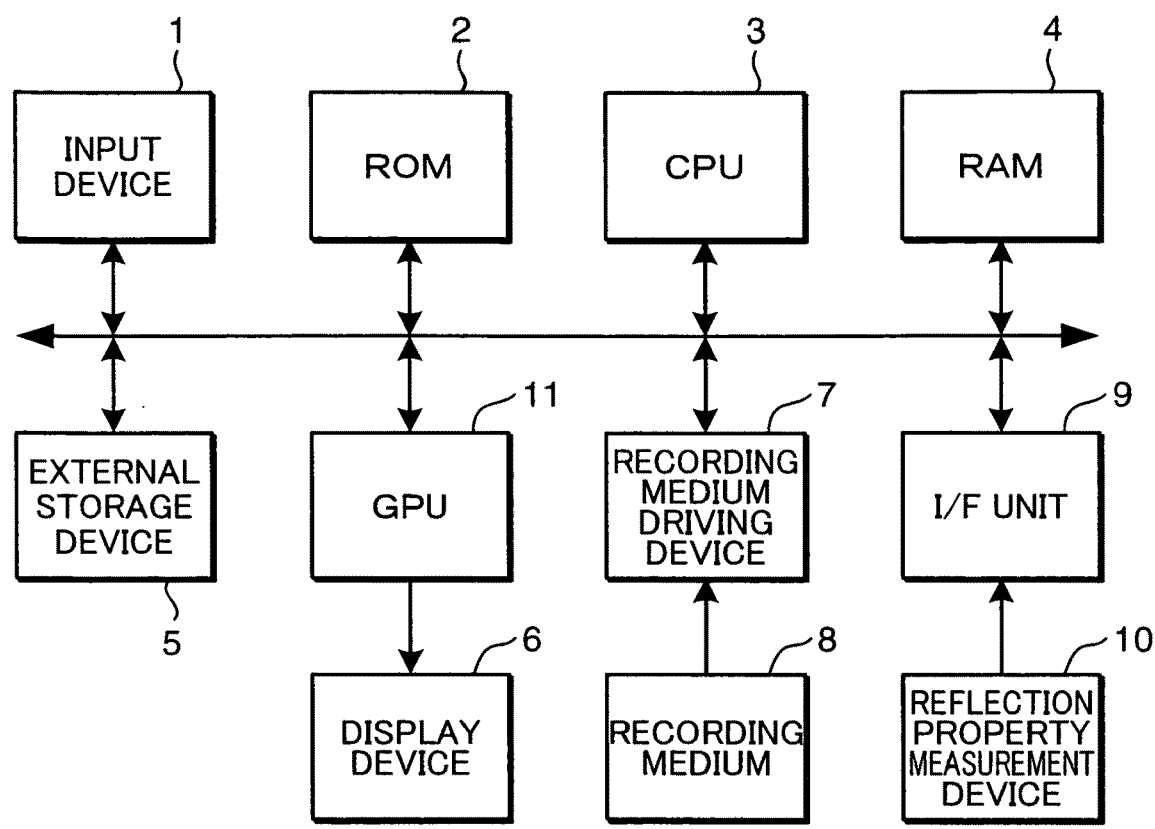
FIG. 1 is a block diagram showing a hardware configuration of a rendering apparatus according to an embodiment of the present invention.

FIG. 1 is a block diagram showing a hardware configuration of a rendering apparatus according to an embodiment of the present invention. The present rendering apparatus is configured by a normal computer or the like and has an input device 1, ROM (read-only memory) 2, CPU (central processing unit) 3, RAM (random access memory) 4, external storage device 5, display device 6, recording medium driving device 7, interface (I/F) unit 9, and GPU (graphic processing unit) 11. The input device 1, ROM 2, CPU 3, RAM 4, external storage device 5, GPU 11, recording medium driving device 7, and I/F unit 9 are connected to an internal bus, via which various data items are input/output, and various processes are executed under the control of the CPU 3.

The input device 1 is configured by a keyboard, mouse, and the like, and is used by a user to input various data items. The ROM 2 stores a system program such as a BIOS (Basic Input/Output System) and the like. The external storage device 5 is configured by a hard disk drive and the like and stores a predetermined OS (Operating System), a rendering program, and the like. The CPU 3 reads the OS and the like from the external storage device 5 and controls the operation of each block. The RAM 4 is used as a work area of the CPU 3.

The display device 6 is configured by a liquid display device or the like and displays various images under the control of the GPU 11. The recording medium driving device 7 is configured by a CD-ROM drive, flexible disk drive and the like.

Note that the rendering program is stored in a computer-readable recording medium 8, such as a CD-ROM, and distributed to the market. The user causes the recording medium driving device 7 to read this recording medium 8 to install the rendering program on the computer. Moreover, the rendering program may be installed on the computer by storing the rendering program in a server on the internet and then downloading the rendering program from the server.

The I/F unit 9 is configured by, for example, a USB interface and provides an input/output interface between a reflection property measurement device 10 and the rendering apparatus.

The reflection property measurement device 10, which is configured by, for example, a shading information acquisition device disclosed in Japanese Patent Publication Application No. 2004-152015, has a specimen table for placing a specimen thereon, a light source for emitting light to the specimen, and a camera receiving reflected light from the specimen, and measures the energy of the reflected light of the specimen while changing the ray direction connecting the light source and the specimen to each other and the eye direction connecting the camera and the specimen to each other, to acquire the reflection property of the specimen. The GPU 11 mainly executes an image processing of the rendering apparatus under the control of the CPU 3 and causes the display device 6 to display the result of the processing.

Figure 2:
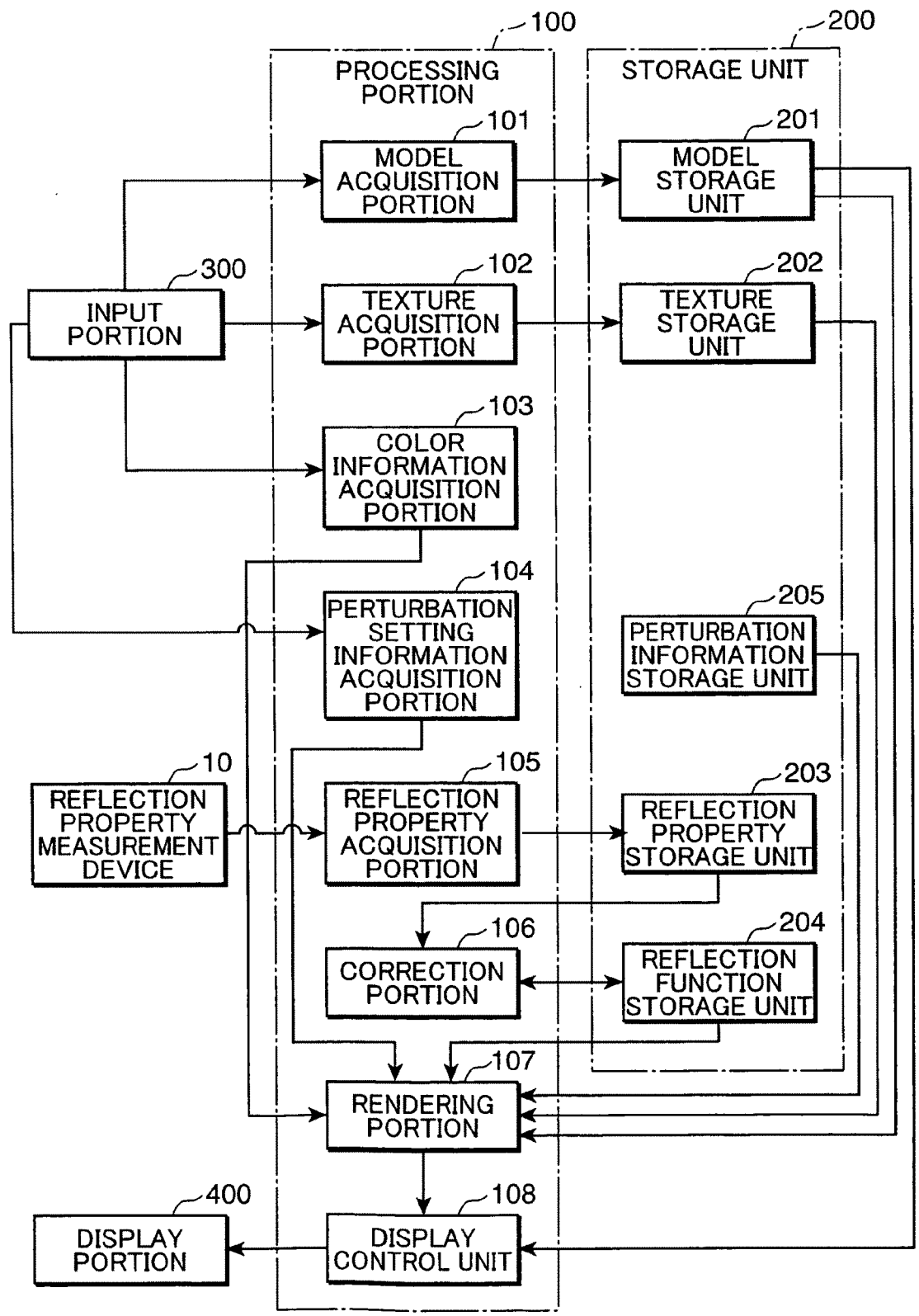
FIG. 2 is a functional block diagram of the rendering apparatus shown in FIG. 1.

FIG. 2 is a functional block diagram of the rendering apparatus shown in FIG. 1. The rendering apparatus has a processing unit 100, storage unit 200, input portion 300 and display portion 400. The processing unit 100 is configured by the GPU 11 and has functions such as a model acquisition portion 101, texture acquisition portion 102, color information acquisition portion 103, perturbation setting information acquisition portion 104, reflection property acquisition portion 105, correction portion 106, rendering portion 107, and display control unit 108. These functions are realized by the GPU 11 executing the rendering program.

The model acquisition portion 101 acquires a sterical model to be rendered, in accordance with an operation input of the user received by the input portion 300, and stores the acquired sterical model in the model storage unit 201. Here, the sterical model is a sterical model of a certain object that is created beforehand within a virtual three-dimensional space by using modeling software.

Figure 3:
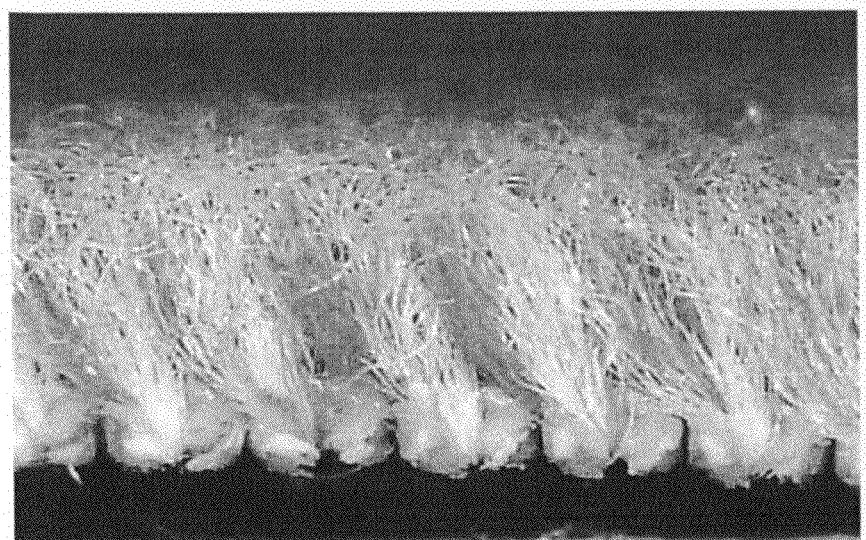
FIG. 3 is a cross-sectional view showing an actual fabric, which is a model of a texture used in the rendering apparatus.

The texture acquisition portion 102 acquires a texture of a fabric that is attached to the surface of the sterical model to be rendered, in accordance with an operation input of the user received by the input portion 300, and stores the texture in the texture storage unit 202. FIG. 3 is a cross-sectional view showing an actual fabric, which is a model of the texture used in the rendering apparatus. As shown in FIG. 3, the fabric serving as the model of the texture is a fabric in which the surface of a flat base texture part having a weaving or knitting structure is napped. Here, when a napping treatment is performed on the surface of the fabric, a thread of yarn is untwisted and the fibers configuring the yarn are stretched toward the top of the base texture part, resulting in forming a napped fabric surface.

Figure 4:
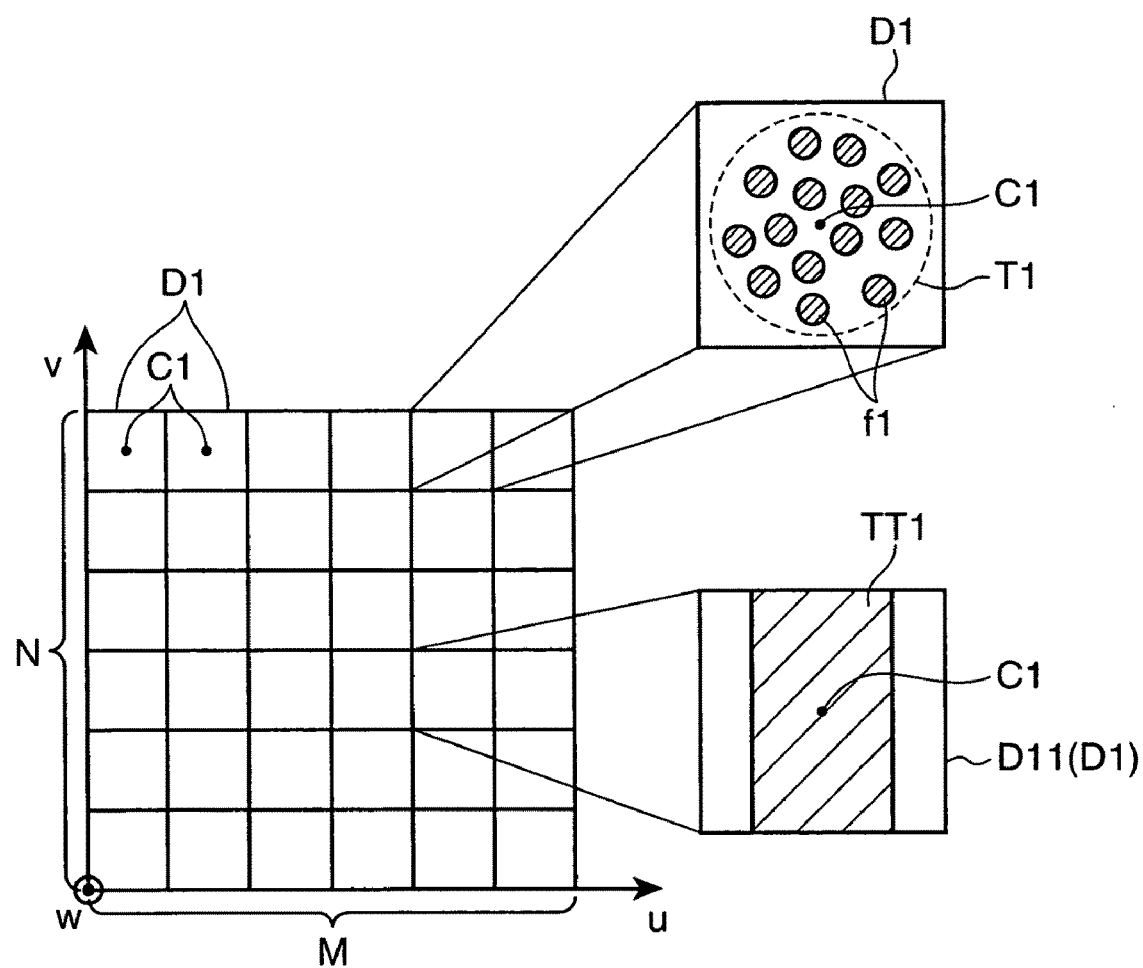
FIG. 4 is a schematic diagram showing a data structure of the texture.

FIG. 4 is a schematic diagram showing a data structure of the texture. As shown in FIG. 4, the texture is configured by the coordinates of a sample point C1 that is located in a predetermined position (e.g., the center of gravity) on the inside of each of a plurality of rectangular regions D1 arrayed in N lines and M columns on u, v-axes expressing the position of the fabric surface and perpendicular to each other, as well as texture information associated with the sample point C1. The texture information includes height information, fiber density information, fiber direction information, and normal direction information. Here, each rectangular region D1 has a size (e.g., size of several micron order) equivalent to, for example, a predetermined number (one, for example) of yarns T1 subjected to the napping treatment.

The height information represents the height of each napped yarn T1 of each sample point C1, that is, a leading end of the yarn T1 in a w-axis representing the height direction perpendicular to a u-v plane.

The fiber density information represents the density of the yarns T1 within the rectangular region D1 that are napped on the upper side of the base texture part. Specifically, the fiber density information represents the ratio of the cross-sectional area of fibers f1 configuring each yarn T1 to the area of the rectangular region D1.

The fiber direction information is a unit vector representing the direction of the yarns within the rectangular region D1. The fiber direction information of the yarns T1 napped on the upper side of the base texture part is the unit vector representing the direction of the fibers f1 configuring each yarn T1. Specifically, a representative value (average value, for example) of the unit vector representing the direction of each fiber f1 present in the rectangular region D1 is adopted as the fiber direction information of the yarns T1. Moreover, in a rectangular region D11 where the napped yarns T1 do not exist, the fiber direction information is the unit vector representing a longitudinal direction of warp yarns TT1 of the base texture part. The normal direction information is a unit vector representing the normal direction of the yarns within the rectangular region D1.

The color information acquisition portion 103 acquires color information for specifying the color of the surface of the sterical model in accordance with an operation input of the user received by the input portion 300.

The perturbation setting information acquisition portion 104 acquires perturbation setting information for applying a bias to the direction of the fibers configuring the napped yarns and perturbing the fibers in accordance with an operation input of the user received by the input portion 300.

The reflection property acquisition portion 105 acquires a reflection property of an actual yarn that is measured by the reflection property measurement device 10, and stores the acquired reflection property in a reflection property storage unit 203.

The correction portion 106 reads the reflection property of the actual yarn from the reflection property storage unit 203 and corrects a reflection function by means of parameter fitting, so that the error between the read reflection property of the actual yarn and the energy of reflected light obtained from the reflection function of the yarn stored in a reflection function storage unit 204 becomes minimum.

Specifically, the reflection function stored in the reflection function storage unit 204 is a function expressing the energy of the reflected light of the yarn in accordance with the ray direction, eye direction and fiber direction within the virtual three-dimensional space, and has a specular reflection component representing the energy of specular reflected light of the yarn, a first diffuse reflection component representing the energy of diffuse reflected light related to the fiber direction of the yarn, the diffuse reflected light being part of diffuse reflected light of the yarn, a second diffuse reflection component representing the energy of diffuse reflected light that is not related to the fiber direction of the yarn, the diffuse reflected light being part of the diffuse reflected light of the yarn, and a napped reflection component representing the energy of reflected light scattered by the fibers f1 configuring each napped yarn T1.

Here, the specular reflection component has a variable part, a specular reflection coefficient related to the variable part, and a glossiness coefficient representing the spread of the distribution of the energy of the specular reflected light. The first diffuse reflection component has a variable part defined by the ray direction and the fiber direction, and a first diffuse reflection coefficient related to the variable part. A second diffuse reflection component has a variable part defined by the ray direction and the normal direction of the yarn, and a second diffuse reflection coefficient.

Specifically, the reflection function is expressed by Equation (1).

$$I = I_s + I_{d1} + I_{d2} + W \tag{1}$$

Here, $I_s$ represents the specular reflection component, $I_{d1}$ the first diffuse reflection component, $I_{d2}$ the second diffuse reflection component, and W the napped reflection component.

The specular reflection component $I_s$ shown in Equation (1) is expressed by Equation (2).

$$I_s = K_s \cdot S \cdot \cos^p[\text{acos}\{L*(-T)\} - \text{acos}(V*T)] \tag{2}$$

$K_s$ shown in Equation (2) represents the specular reflection coefficient, L the ray direction, V the eye direction, T the fiber direction, and "*" the inner product of the vector. S is a shading correction coefficient for reproducing the reduction of the energy of the specular reflected light, which is caused by the presence of a shading region that the light from the light source does not reach, and this shading correction coefficient is expressed by Equation (3).

$$S = 1 - (1/\pi) \cdot \operatorname{acos}[\{(L - (L^*T)T)/|L - (L^*T)T|\} * \{(V - (V^*T)T)/|V - (V^*T)T|\}] \quad (3)$$

Figure 5:
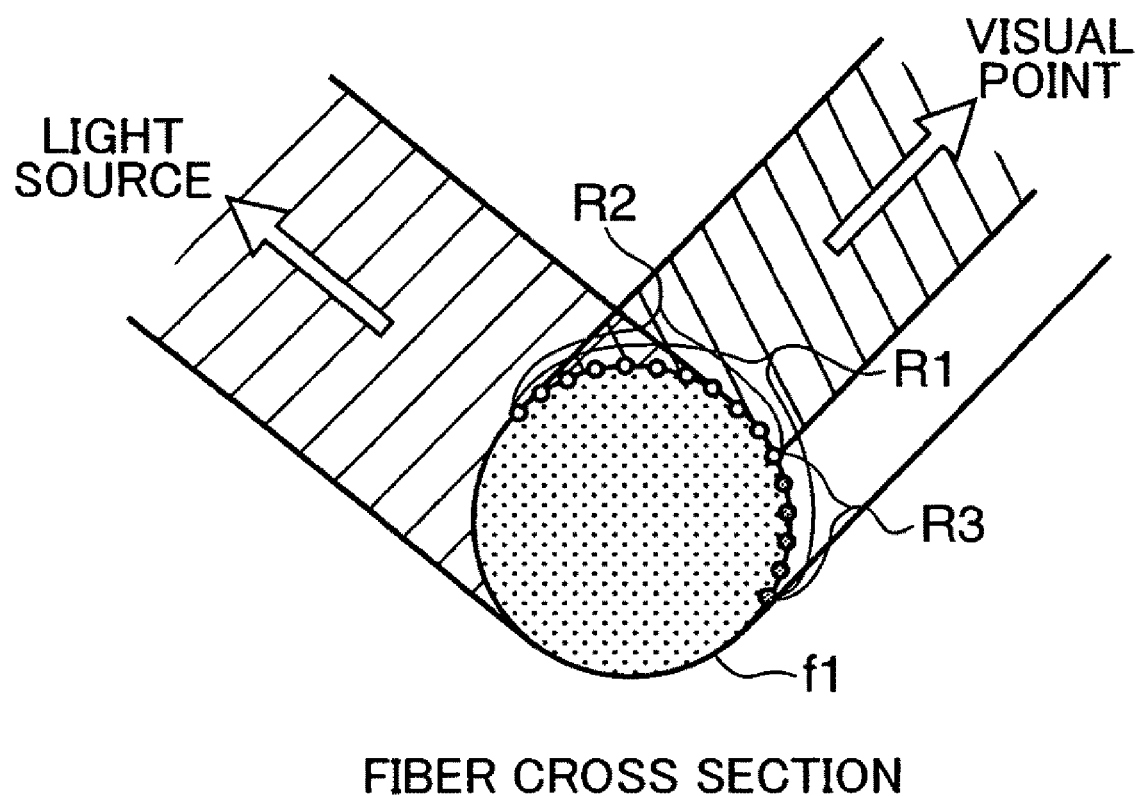
FIG. 5 is a diagram descriptive of a shading correction coefficient.

FIG. 5 is a diagram descriptive of the shading correction coefficient. Because the fibers f1 have a cylindrical shape, a reaching region R2 that the light from the light source reaches and a shading region R3 that the light does not reach are generated within a region R1 on the surface of the fibers f1 where the fibers f1 can be viewed from a visual point. As a result, the energy of the specular reflection light is reduced. In the rendering apparatus, therefore, the cross section of the fibers f1 is assumed as a circle, and the shading correction coefficient S expressing the ratio of the size of the reaching region R2 to the size of the region R1 is provided to the specular reflection component $I_s$, in order to reproduce the reduction of the energy of the specular reflection component.

The value p shown in Equation (2) represents the glossiness coefficient expressing the spread of the glossiness, and is obtained by the correction portion 106 using parameter fitting.

The first diffuse reflection component $I_{d1}$ shown in Equation (1) is expressed by Equation (4).

$$I_{d1} = K_{d1} \cdot \sin(\operatorname{acos}(L^*T)) \quad (4)$$

The value $K_{d1}$ shown in Equation (4) represents the first diffuse reflection coefficient.

The second diffuse reflection coefficient $I_{d2}$ shown in Equation (1) is expressed by Equation (5)

$$I_{d2} = K_{d2} \cdot (L^*N) \quad (5)$$

The value $K_{d2}$ shown in Equation (5) represents the second diffuse reflection coefficient. Moreover, the value N is a unit vector representing the normal direction.

The napped reflection component W shown in Equation (1) is expressed by Equation (6).

$$W = (d/N^*V) \cdot (L^*N) \quad (6)$$

The value d shown in Equation (6) represents the fiber density, and the fiber density information included in the texture is substituted into Equation (6).

Figure 19:
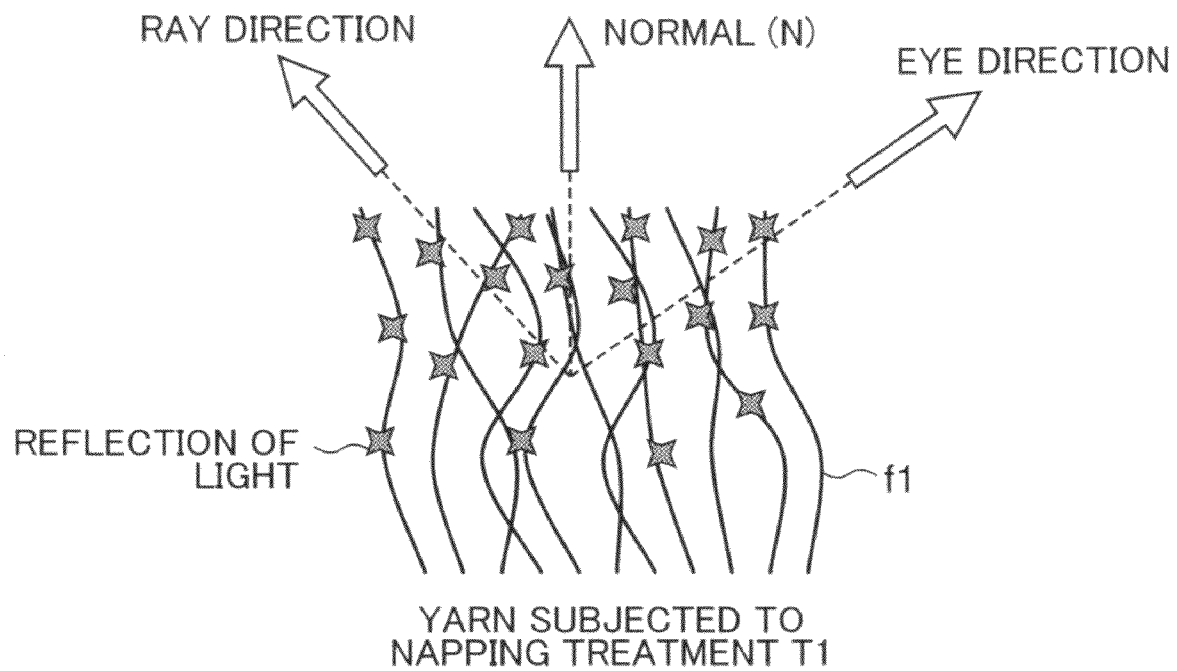
FIG. 19 is a diagram descriptive of a napped reflection component.
Figure 20:
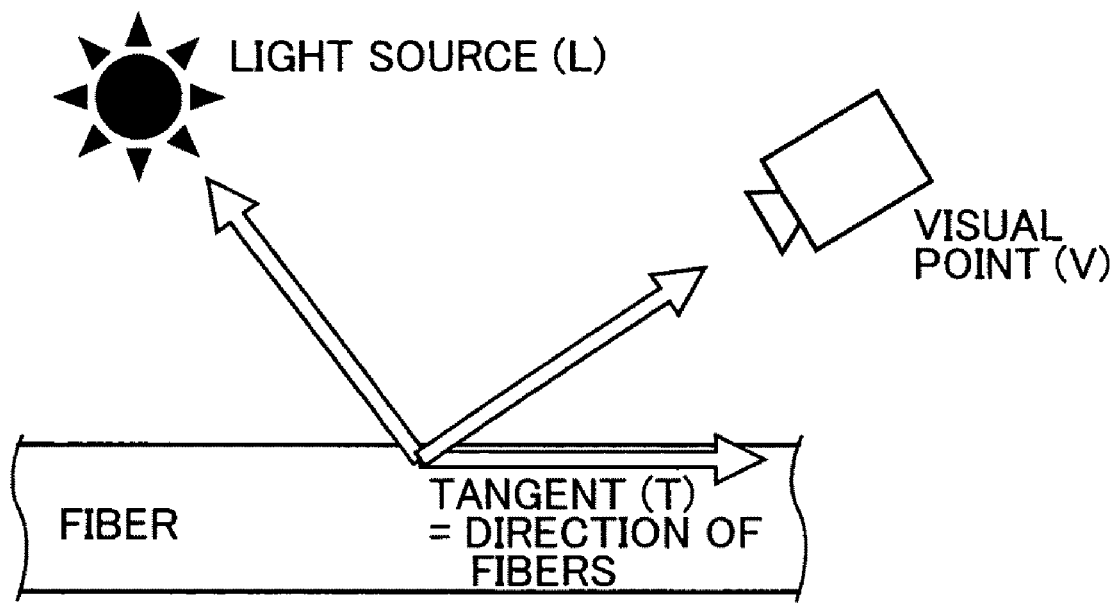
FIG. 20 is a diagram for explaining a Kajiya-Kay model.

FIG. 19 is a diagram descriptive of the napped reflection component W. Because each napped yarn T1 is configured by the plurality of scattered fibers f1, the light from the light source is reflected at a number of sections, whereby the reflected light is scattered. Therefore, the rendering apparatus provides the napped reflection component W to the reflection function in order to reproduce the scattering of this reflected light.

The correction portion 106 calculates the specular reflection coefficient $K_s$, the glossiness coefficient p, the first diffuse reflection coefficient $K_{d1}$, and the second diffuse reflection coefficient $K_{d2}$ by using the parameter fitting, so that the reflection function obtains the reflection property of the actual yarn.

Note that the correction portion 106 may calculate at least one coefficient of the specular reflection coefficient $K_s$, the glossiness coefficient p, the first diffuse reflection coefficient $K_{d1}$, and the second diffuse reflection coefficient $K_{d2}$. In this case, a predetermined value is set for the coefficient that is not to be set, and the coefficient to be set may be obtained by means of the parameter fitting.

Moreover, the correction portion 106 normalizes the specular reflection coefficient $K_s$, the first diffuse reflection coefficient $K_{d1}$, and the second diffuse reflection coefficient $K_{d2}$, and sets the normalized specular reflection coefficient $K_s$, first diffuse reflection coefficient $K_{d1}$ and second diffuse reflection coefficient $K_{d2}$ as the coefficients of the reflection function incorporating the color information, so that the total of the distribution of the energy of the reflected light obtained from the reflection function becomes 1 when the light source that outputs light having an energy of 1 is disposed in a predetermined position of the virtual three-dimensional space.

Here, the reflection function incorporating the color information is expressed by Equation (7).

$$I = F \cdot I_s + C_{RGB} \cdot (1 - F) I_s + C_{RGB} \cdot I_{d1} + C_{RGB} \cdot I_{d2} + W \quad (7)$$

The value F shown in Equation (7) represents a Fresnel's formula and is expressed by Equation (8).

$$F = (\tfrac{1}{2}) \cdot (\tan^2(\theta 1 - \theta 2)/\tan^2(\theta 1 + \theta 2) + \sin^2(\theta 1 - \theta 2)/\sin^2(\theta 1 + \theta 2)) \quad (8)$$

The value $\theta 1$ shown in Equation (8) represents an incidence angle, and the value $\theta 2$ represents a reflecting angle. Predetermined values are employed to both values.

The value $C_{RGB}$ shown in Equation (7) represents the color information applied to the sterical model and is composed of three color components of R, G and B. The color information of the texture attached to the sterical model or the color information acquired by the color information acquisition portion 103 is employed. Because $C_{RGB}$ is composed of the three color components of R, G and B, the value I shown in Equation (7) is composed of the three color components of R, G and B.

The rendering portion 107 renders the sterical model stored in the model storage unit 201, by using the reflection function shown in Equation (7) in which the coefficients are calculated by the correction portion 106, the color information acquired by the color information acquisition portion 103 or default color information, and the texture stored in the texture storage unit 202.

The display control unit 108 displays, on the display portion 400, the sterical model rendered by the rendering portion 107.

The storage unit 200 is configured by the RAM of the GPU 11 shown in FIG. 1, the external storage device 5 and the like, and has the model storage unit 201, the texture storage unit 202, the reflection property storage unit 203, the reflection function storage unit 204, and a perturbation information storage unit 205. The model storage unit 201 stores the sterical model acquired by the model acquisition portion 101. The texture storage unit 202 stores the texture acquired by the texture acquisition portion 102. The reflection property storage unit 203 stores the reflection property of the actual yarn that is acquired by the reflection property acquisition portion 105. The reflection function storage unit 204 stores the reflection functions shown in Equations (1) and Equation (7).

The perturbation information storage unit 205 stores perturbation information associated with the position (perturbation position) on the sterical model surface of the yarn to be perturbed, and a perturbation vector representing a direction to be corrected out of the directions of the napped yarns in the perturbation position. Here, a position and a direction that are determined beforehand in accordance with the property of the real fabric are employed as the perturbation position and the perturbation vector respectively, the real fabric being a model of the texture attached to the surface of the sterical model.

The input portion 300 is configured by the input device 1 shown in FIG. 1, and receives, from the user, operation inputs for setting the sterical model, texture, color information, perturbation setting information and the like.

The display portion 400 is configured by the display device 6 shown in FIG. 1 and displays the sterical model rendered by the rendering portion 107.

Figure 6:
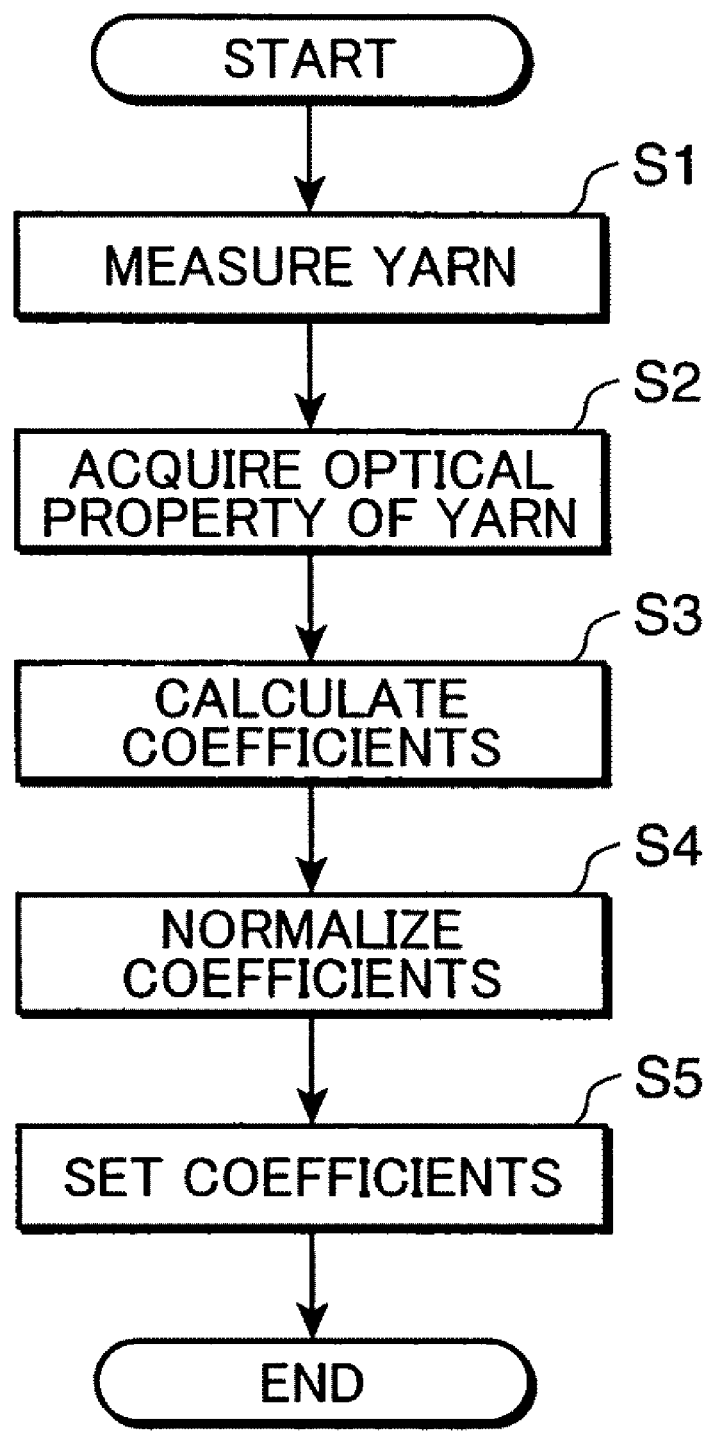
FIG. 6 is a flowchart showing a processing for calculating coefficients included in a reflection function, the processing performed by the rendering apparatus.

FIG. 6 is a flowchart showing a processing for calculating the coefficients included in the reflection function, the processing performed by the rendering apparatus. First, in step S1, the reflection property measurement device 10 emits light to the actual yarn placed on a specimen loading table, and measures the energy of the reflected light of the yarn while changing the ray direction and the eye direction.

FIG. 7 is a diagram showing an actual yarn T2 placed on the specimen loading table. As shown in FIG. 7, the yarn T2 is wound several times around a disk-shaped bobbin. The reflection property measurement device 10 emits light to the wound yarn T2, receives reflected light therefrom, and acquires the energy of the yarn T2. The longitudinal direction of the yarn T2 wound around the bobbin is taken as a yarn vertical direction, and the direction perpendicular to the yarn vertical direction is taken as a yarn horizontal direction.

Figure 8A:
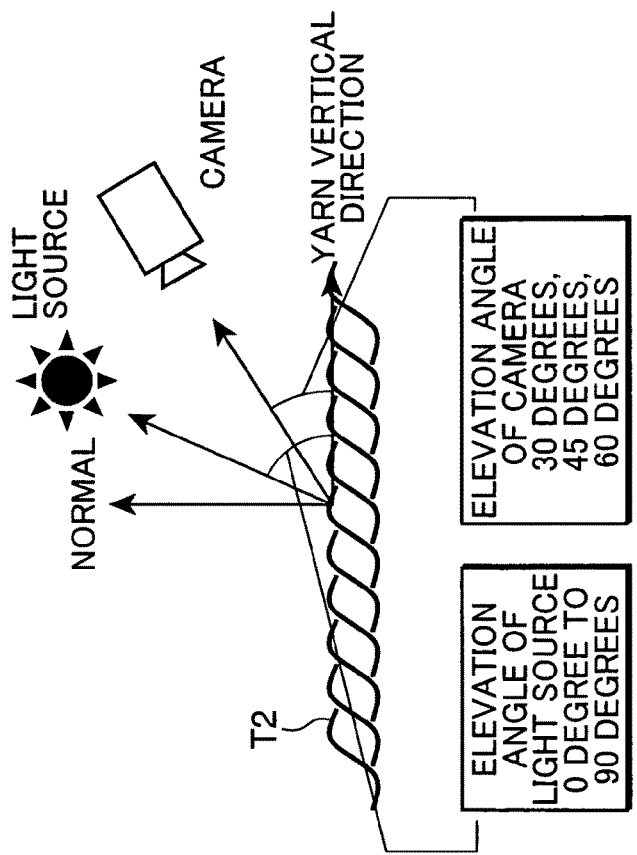
FIG. 8 is a diagram descriptive of a yarn measuring method performed by a reflection property measurement device, wherein (A) shows the case where the azimuth angle formed by a camera and a light source is 180 degrees, and (B) shows the case where the azimuth angle formed by the camera and the light source is 0 degree.

FIG. 8 is a diagram descriptive of a method for measuring the yarn T2 by a reflection property measurement device 10, wherein (A) shows the case where the azimuth angle formed by a camera and a light source is 180 degrees, and (B) shows the case where the azimuth angle formed by the camera and the light source is 0 degree. First, as shown in FIG. 8(A), the reflection property measurement device 10 keeps the azimuth angle between the camera and the light source at 180 degrees, sets the elevation angle of the camera relative to the yarn T2 at 30 degrees, changes the elevation angle of the light source relative to the yarn T2 at a predetermined resolution from 0 degree to 90 degrees, and causes the camera to capture an image of the yarn T2 every time the angle of the light source is changed. Here, the azimuth angle between the light source and the camera is set such that the direction of a straight light connecting the light source to the camera is oriented in the yarn vertical direction.

Next, the reflection property measurement device 10 sets the elevation angle of the camera at 45 degrees, changes the elevation angle of the light source from 0 degree to 90 degrees at a predetermined resolution, and causes the camera to capture an image of the yarn T2. The reflection property measurement device 10 then sets the elevation angle of the camera at 60 degrees, changes the elevation angle of the light source from 0 degree to 90 degrees at a predetermined resolution, and causes the camera to capture an image of the yarn T2.

Figure 8B:
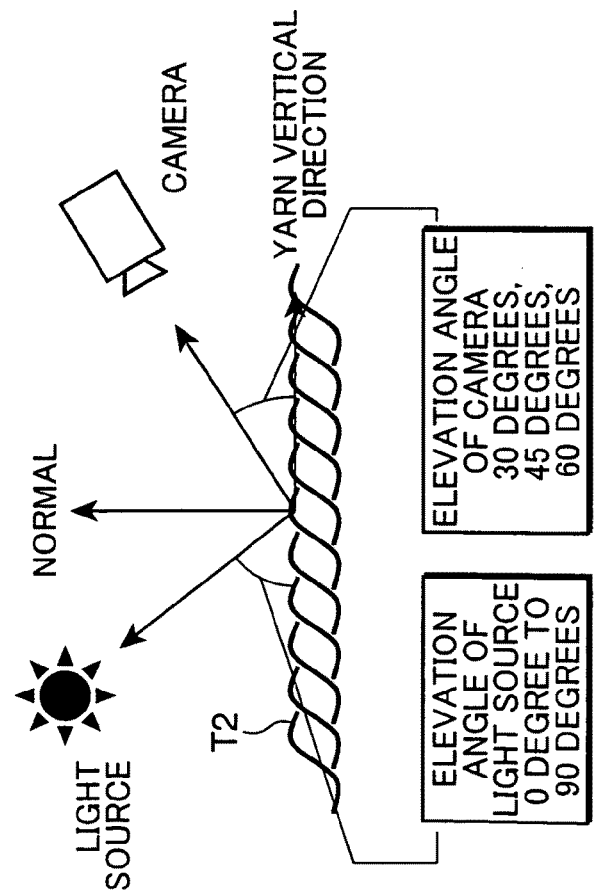

Next, as shown in FIG. 8(B), the reflection property measurement device 10 sets the azimuth angle between the camera and the light source at 0 degree, changes the elevation angles of the light source and the camera as in the case where the azimuth angle is 180 degrees, and causes the camera to capture an image of the yarn T2. Here, the azimuth angle between the camera and the light source is set such that the direction of the straight line connecting the camera to the light source is oriented in the yarn vertical direction.

In this manner, the reflection property measurement device 10 changes the azimuth angle between the light source and the camera and the elevation angles of the light source and camera, captures an image of the yarn T2, receives the reflected light of the yarn T2 that is received by the camera, and measures the reflection property of the yarn T2.

FIG. 9 is a graph showing the reflection property of the yarn T2 measured by the reflection property measurement device 10, wherein the vertical axis represents the energy, and the horizontal axis represents the azimuth angle and the elevation angles of the camera and the light source. As shown in FIG. 9, when the azimuth angle between the camera and the light source is 180 degrees, it can be seen that the energy of the reflected light changes in the form of a upward and substantially steep curve by keeping the elevation angle of the camera constant and changing the elevation angle of the light source. On the other hand, when the azimuth angle between the camera and the light source is 0 degree, it can be seen that the energy of the reflected light increases flatly by keeping the elevation angle of the camera constant and changing the elevation angle of the light source.

In step S2 shown in FIG. 6, the reflection property acquisition portion 105 acquires the reflection property of the yarn T2 measured by the reflection property measurement device 10, and stores the acquired reflection property in the reflection property storage unit 203. Next, the correction portion 106 calculates the specular reflection coefficient $K_s$, the glossiness coefficient p, the first diffuse reflection coefficient $K_{d1}$, and the second diffuse reflection coefficient $K_{d2}$ by using the parameter fitting, so that the error between the energy of the reflected light obtained from the reflection function shown in Equation (1) and the reflection property of the yarn T2 becomes minimum (step S3).

Here, the correction portion 106 sets a predetermined value as the value d representing the fiber density, and calculates the specular reflection coefficient $K_s$, the glossiness coefficient p, the first diffuse reflection coefficient $K_{d1}$ and the second diffuse reflection coefficient $K_{d2}$, so that the square sum of the error between the energy of the reflected light obtained from the reflection function shown in Equation (1) and the reflection property acquired by the reflection property acquisition portion 105 becomes minimum when a ray direction L, and eye direction V, and a normal direction N are changed.

Figure 10:
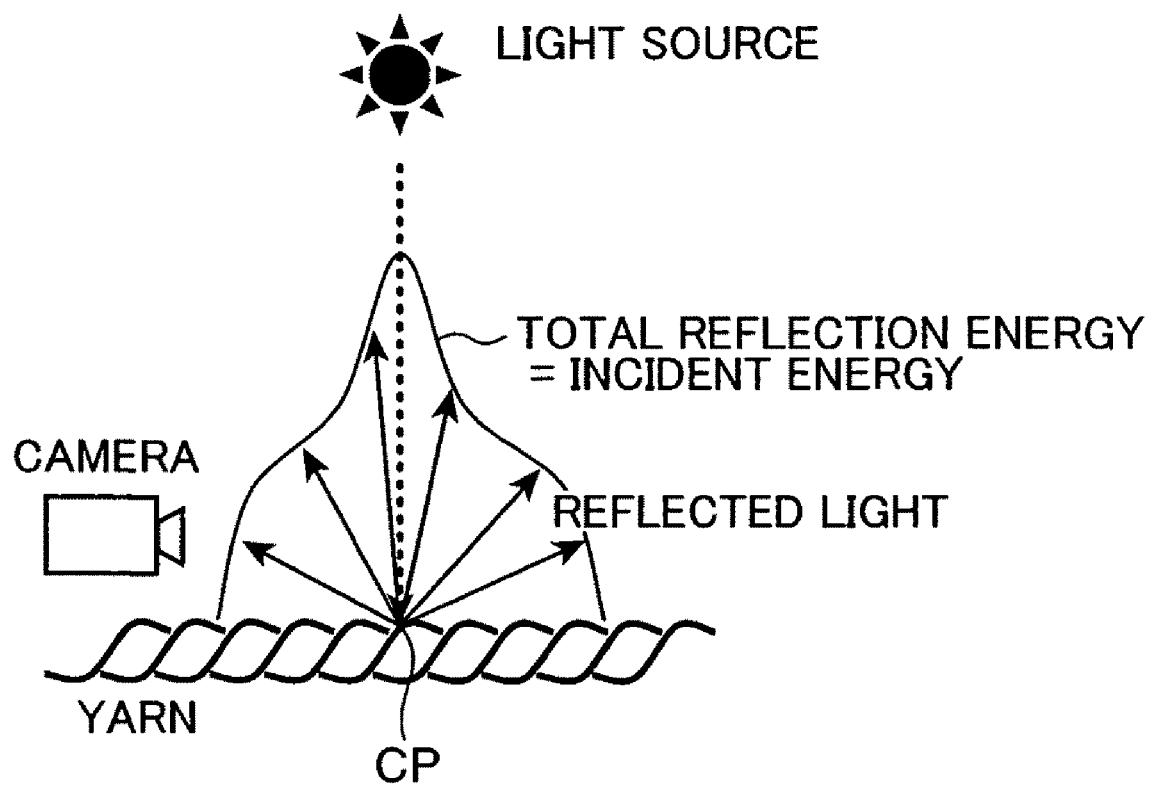
FIG. 10 is a diagram descriptive of the normalization of the coefficients.

The correction portion 106 then normalizes the specular reflection coefficient $K_s$, the first diffuse reflection coefficient $K_{d1}$ and the second diffuse reflection coefficient $K_{d2}$ so that the sum of the energy of the reflected light obtained in each eye direction of the reflection function becomes 1 when the light source that outputs light having an energy of 1 is disposed in a predetermined position of the virtual three-dimensional space (step S4). FIG. 10 is a diagram descriptive of the normalization of the coefficients. As shown in FIG. 10, when the light source is set at a predetermined position (e.g., immediately above a target point CP) within the virtual three-dimensional space, the energy of a predetermined level (1, for example) is allowed to be incident to the target point CP, the azimuth angle between the light source and the camera from 0 degree to 360 degrees, and the elevation angle of the camera is changed from 0 degree to 90 degrees, the specular reflection coefficient $K_s$, the first diffuse reflection coefficient $K_{d1}$, and the second diffuse reflection coefficient $K_{d2}$ are normalized so that the total of the distribution of the energy of the reflected light obtained from the reflection function shown in Equation (1) becomes equal to the energy falling on the target point CP.

Next, the correction portion 106 assigns the coefficients obtained in step S4 to the $I_s$, $I_{d1}$, and $I_{d2}$ shown in Equation (7), and sets the coefficients of the reflection function incorporating the color information (step S5).

Figure 11:
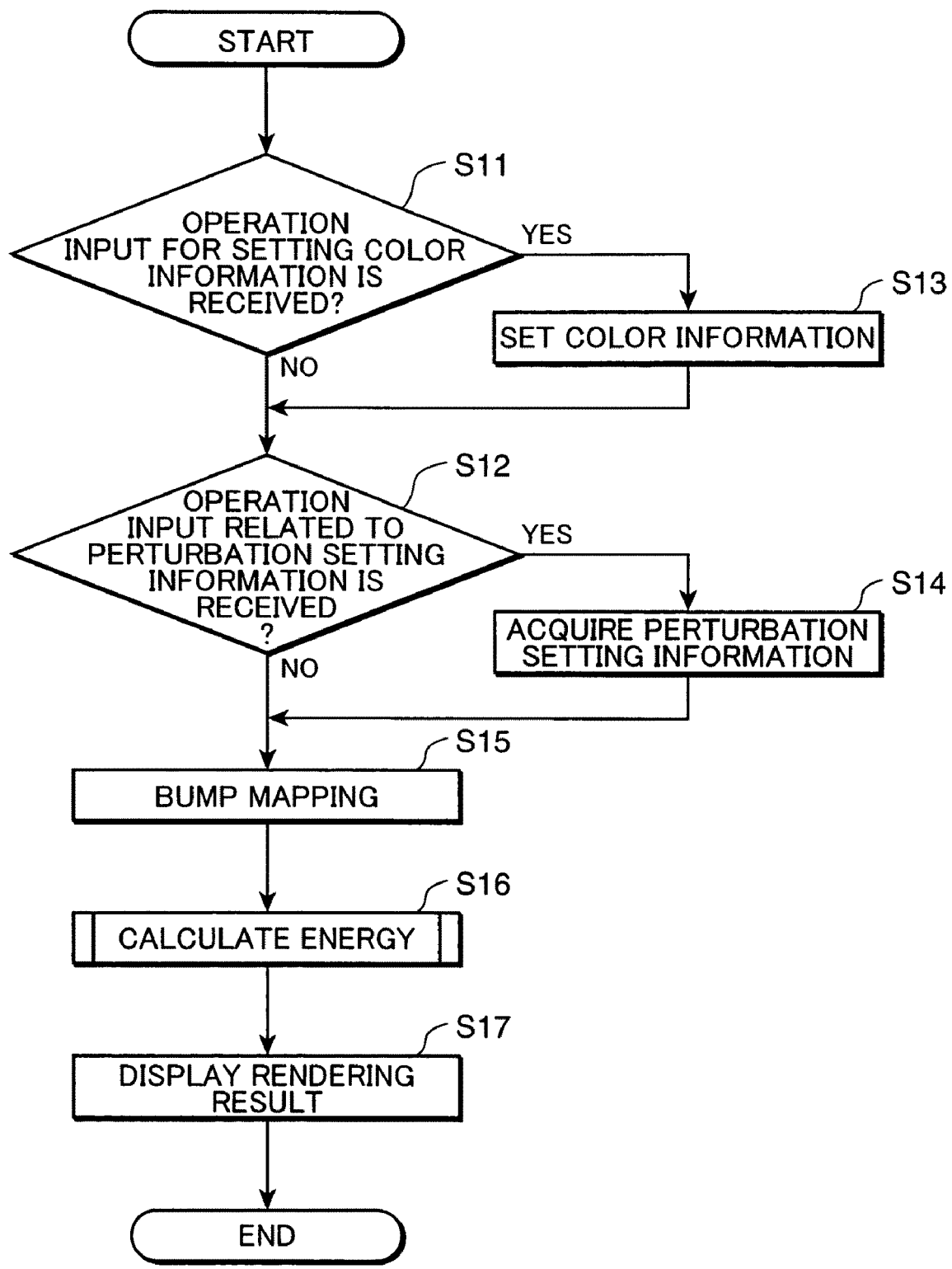
FIG. 11 is a flowchart showing a rendering processing performed by the rendering apparatus.

A rendering processing performed by the rendering apparatus is described next. FIG. 11 is a flowchart showing the rendering processing performed by the rendering apparatus. First, in step S11, when an operation input related to the color information for specifying the color of the sterical model surface is received from the user by the input portion 300 (YES in step S11), the color information acquisition portion 103 acquires the color information, delivers the color information to the rendering portion 107, the rendering portion 107 assigns the acquired color information to $C_{RGB}$ of the reflection function shown in Equation (7), and sets the color information (step S13).

When, on the other hand, the operation input related to the color information for specifying the color of the sterical model surface is not received from the user by the input portion 300 (NO in step S11), the processing proceeds to step S12. In this case, the rendering portion 107 sets preset color information for $C_{RGB}$ show in Equation (7).

Next, when an operation input related to the perturbation setting information is received by the input portion 300 (YES in step S12), the perturbation setting information acquisition portion 104 acquires the perturbation setting information (step S14). Here, the display control unit 108 causes the display portion 400 to display an operation button or the like for allowing the user to input the perturbation setting information, and allows the user to click the operation button using a mouse, to input the perturbation setting information.

Figure 12:
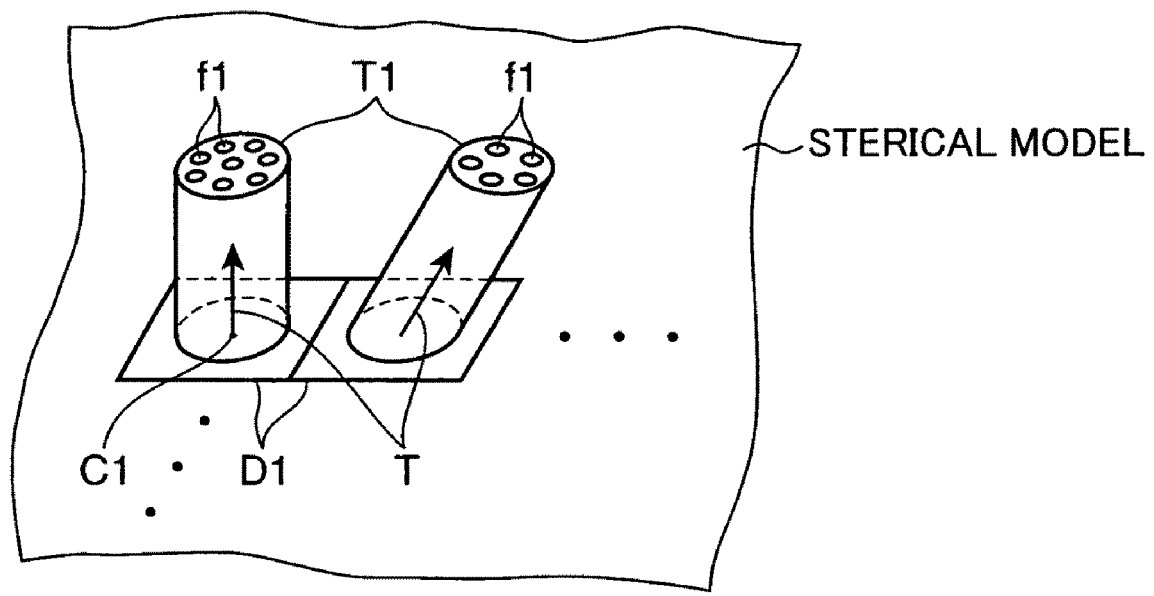
FIG. 12 is a diagram showing a sterical model bump-mapped by a rendering portion.

Next, the rendering portion 107 reads the sterical model from the model storage unit 201, and bump-maps the texture stored in the texture storage unit 202 to the read sterical model (step S15). FIG. 12 is a diagram showing the sterical model bump-mapped by the rendering portion 107. As shown in FIG. 12, the rendering portion 107 attaches the texture to the sterical model surface, sets the sample point C1 on the sterical model surface, and sets, as each of the yarns T1, a cylinder that has a fixed cross-sectional area, so that the center of the bottom surface of the cylinder is positioned on the sample point C1. Here, the length of each yarn T1 in the longitudinal direction is defined from the height information of the sample C1, and the fiber direction T of the yarn T1 is defined from the fiber direction information of the sample point C1.

When the perturbation setting information is acquired by the perturbation setting information acquisition portion 104, the rendering portion 107 reads the perturbation information from the perturbation information storage unit 205 and corrects the fiber direction T of the yarn T1 in accordance with the read perturbation information. Specifically, when the napped yarn T1 is set as the perturbation position by the perturbation information, the rendering portion 107 combines a perturbation vector associated with the perturbation position with the fiber direction of the yarn T1 and corrects the direction of the yarn T1.

Figure 13:
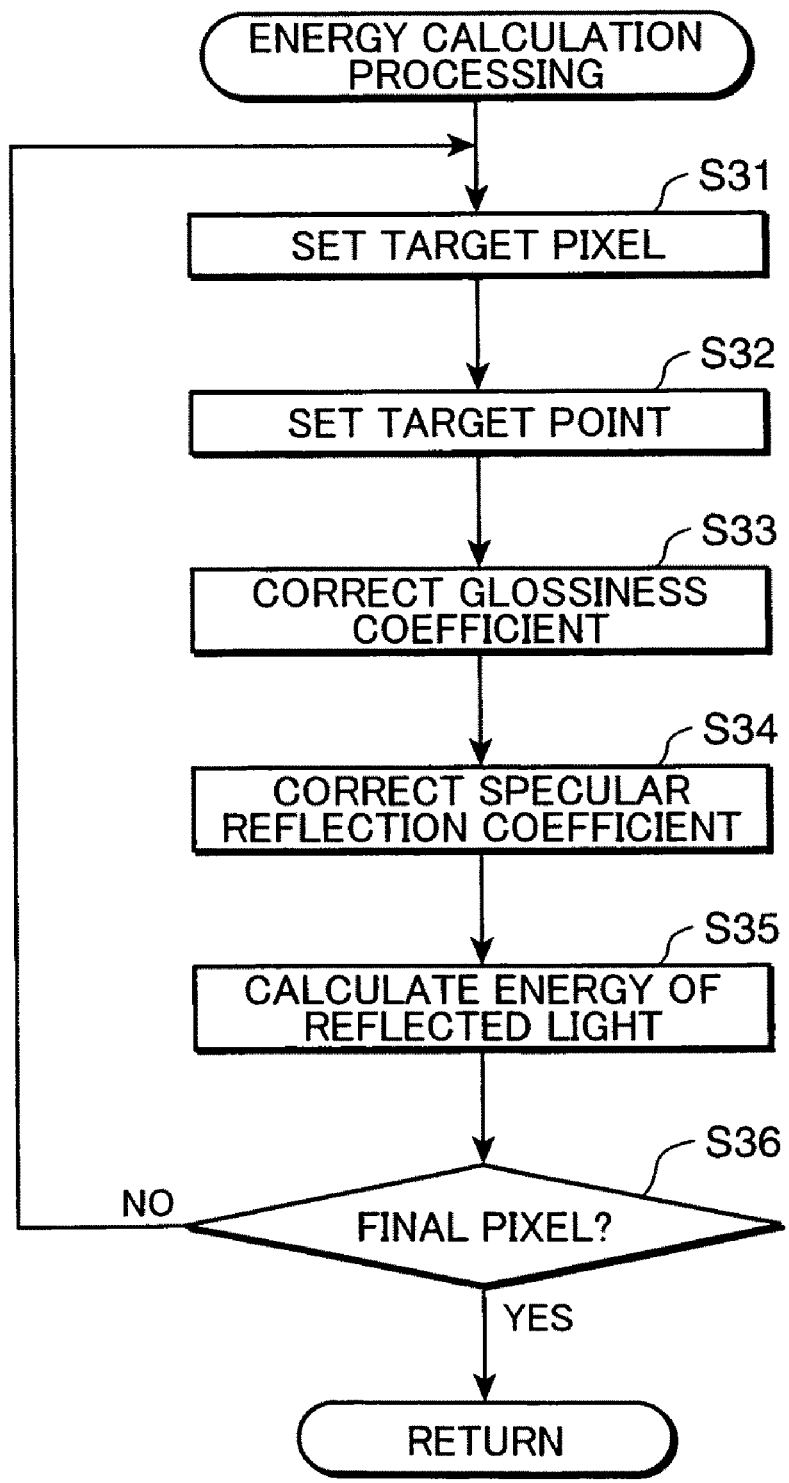
FIG. 13 is a flowchart showing an energy calculation processing.
Figure 14:
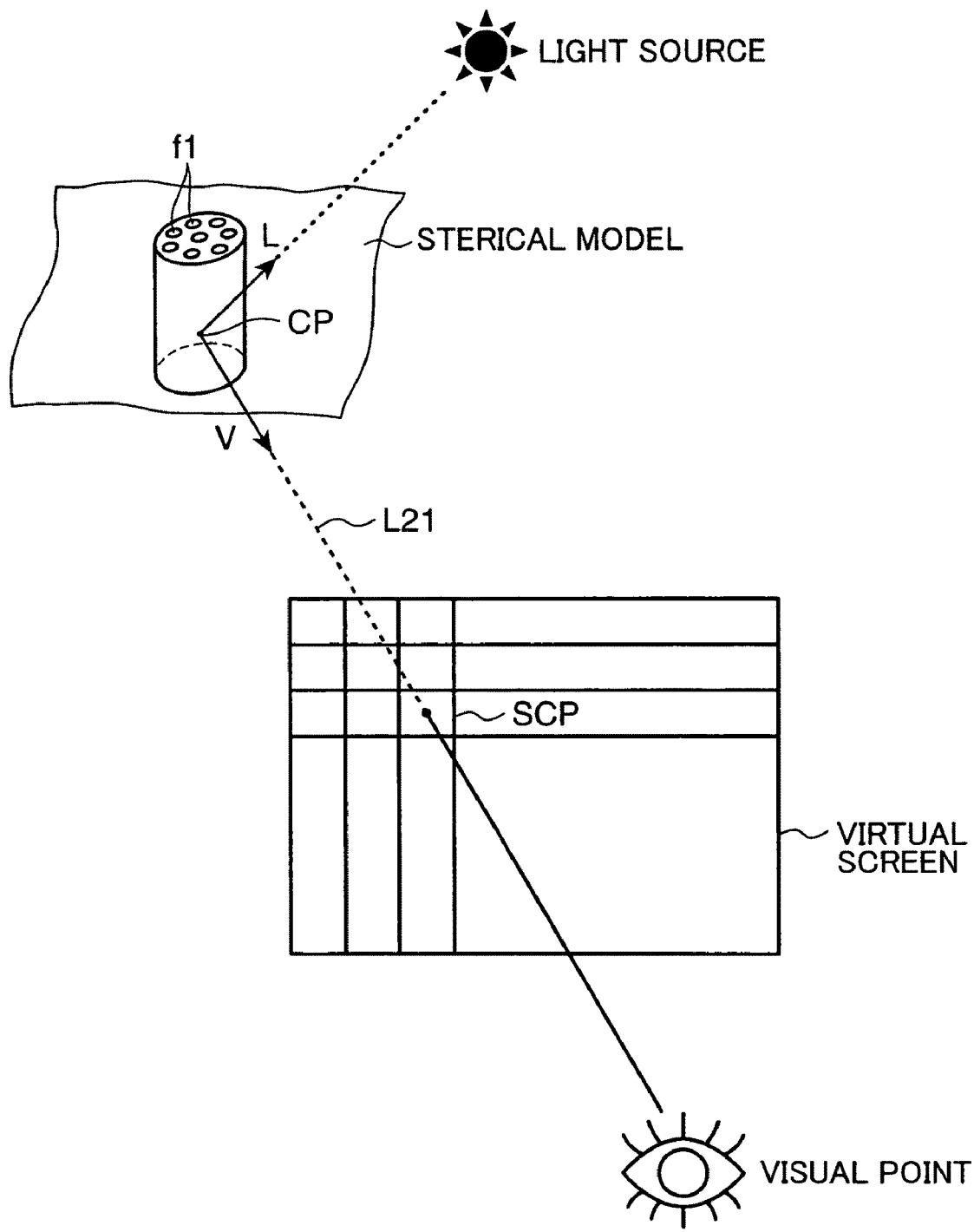
FIG. 14 is a diagram showing a virtual screen that is set within a virtual three-dimensional space.

In step S16 shown in FIG. 11, the rendering portion 107 executes a processing for calculating the energy of the reflected light of the sterical model in which the yarn T1 is set on the surface of the sterical model. FIG. 13 is a flowchart showing an energy calculation processing. First, in step S31, a virtual screen is set within a virtual three-dimensional space, and one of a plurality of pixels configuring the virtual screen is set as a target pixel (step S31). FIG. 14 is a diagram showing the virtual screen that is set within the virtual three-dimensional space. As shown in FIG. 14, the virtual screen is configured by pixels arrayed in the form of a lattice in a predetermined number of lines×a predetermined number of columns. The rendering portion 107 sequentially sets, from, for example, an upper left top pixel toward a lower right top pixel on the virtual screen, one of the plurality of pixels of the virtual screen as a target pixel SCP.

Next, the rendering portion 107 determines whether or not the sterical model exits on an extended line L21 of a straight line that connects the target pixel SCP to a visual point that is set beforehand within the virtual three-dimensional space. When the rendering portion 107 determines that the sterical model exists on the extended line L21, the rendering portion 107 sets an intersecting point between the sterical model surface and the extended line L21 as the target point CP (step S32).

The rendering portion 107 then calculates the spread of the glossiness of the yarn T1 in which the target point CP is set.

FIG. 15 is a diagram descriptive of a step of calculating the spread of glossiness. The rendering portion 107 assigns the fiber density information defined by the texture for the yarn T1 in which the target point is set CP, to the value d of Equation (9), and corrects the glossiness coefficient so that the distribution of the energy of the specular reflected light in the target point CP spreads more towards the lower fiber density information (step S33). Specifically, because the value p' increases as the fiber density becomes high, the distribution of the energy of the specular reflected light spreads out more towards the lower fiber density information, by assigning the value p' to the value p of Equation (2).

$$p' = p \cdot d^2 \qquad (9)$$

However, the value p' represents the corrected glossiness coefficient, and the value p represents the glossiness coefficient of the yarn T1 in which the target point CP is set.

Next, the rendering portion 107 corrects the specular reflection coefficient $K_s$ by using Equation (10), so that the total amount of the distribution of the energy of the specular reflection component $I_s$ is kept constant before and after correcting the glossiness coefficient (step S34).

$$K_s' = ((p'+1)/(p+1)) \cdot K_s \qquad (10)$$

However, the value $K_s'$ represents the corrected specular reflection coefficient $K_s$, and the value $K_s$ represents the specular reflection component before correction.

Specifically, as shown in FIG. 15, the total amount of the energy of the specular reflected light increases by spreading the distribution of the energy of the specular reflected light in the target point CP by means of Equation (9), and the effect of normalizing the coefficient in step S4 becomes weak. Therefore, the rendering portion 107 corrects the specular reflection coefficient $K_s$ such that the total amount of the distribution of the energy of the specular reflected light is kept constant by Equation (10) before and after correcting the glossiness coefficient shown in Equation (9).

Next, the rendering portion 107 uses Equation (7) to calculate the energy of the reflected light obtained in the target point CP (step S35), and then obtains the calculated energy of the reflected light as pixel data of the target pixel SCP. Here, the rendering portion 107 obtains a ray direction L and an eye direction V in the target point CP, from the positions of the light source and visual point within the virtual three-dimensional space, as shown in FIG. 14. The rendering portion 107 also obtains the fiber direction T of the yarn T1 in which the target point CP is set, as the fiber direction T of the target point CP. The rendering portion 107 further obtains the normal direction N of the yarn T1 in which the target point CP is set, as the normal direction N of the target point CP.

Then, the rendering portion 107 assigns the obtained ray direction L, eye direction V and fiber direction T to the values L, V and T of Equations (2) to (6), assigns the glossiness coefficient p' corrected in step S33 to the value p of Equation (2), assigns the specular reflection coefficient $K_s'$ corrected in step S34 to the value $K_s$ of Equation (2), assigns the fiber density information defined with respect to the yarn T1 in which the target point CP is set, to the value d of Equation (6), computes Equation (7), and calculates the energy of the reflected light obtained in the target point CP.

Next, when the processes of steps S31 to S35 are executed on the final pixel of the virtual screen (YES in step S36), the rendering portion 107 ends the energy calculation processing. When the processes of steps S31 to S35 are not executed on the final pixel (NO in step S36), the rendering portion 107 returns the processing to step S31.

Returning to FIG. 11, the rendering portion 107 outputs the virtual screen to the display control unit 108, and the display control unit 108 displays the virtual screen on the display portion 400 and displays a rendering result of the sterical model on the display portion 400 (step S17).

Figure 16B:
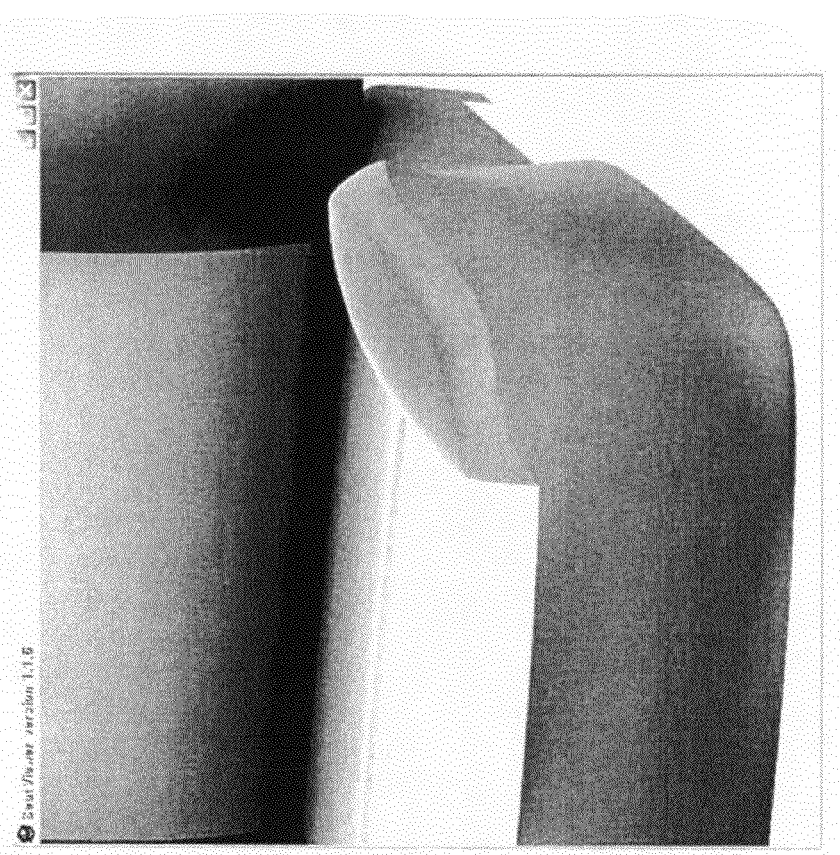
FIG. 16 is an image diagram showing rendering results obtained by the rendering apparatus when a car seat is employed as the sterical model, wherein (A) shows the case where the front section of a seating part of the car seat is viewed from above, and (B) shows the case where the front section of the seating part of the car seat is viewed from the front.
Figure 16A:
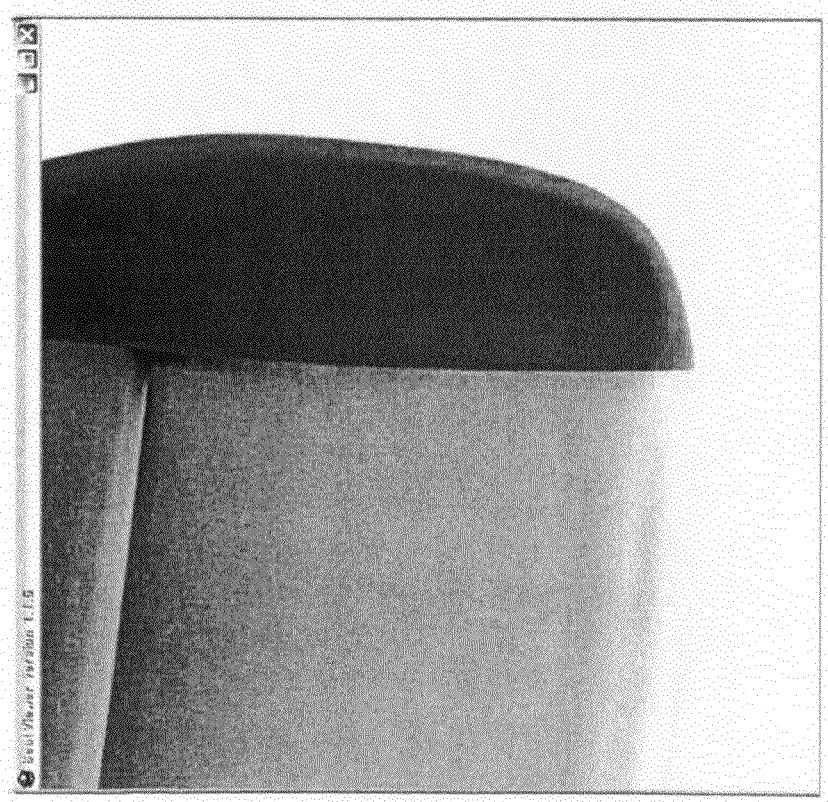

FIG. 16 is an image diagram showing rendering results obtained by the rendering apparatus when a car seat is employed as the sterical model, wherein (A) shows the case where the front section of a seating part of the car seat is viewed from above, and (B) shows the case where the front section of the seating part of the car seat is viewed from the front. As shown in FIGS. 16(A), (B), it can be seen that the fabric subjected to the napping treatment is realistically reproduced on the surface of the car seat.

Figure 17:
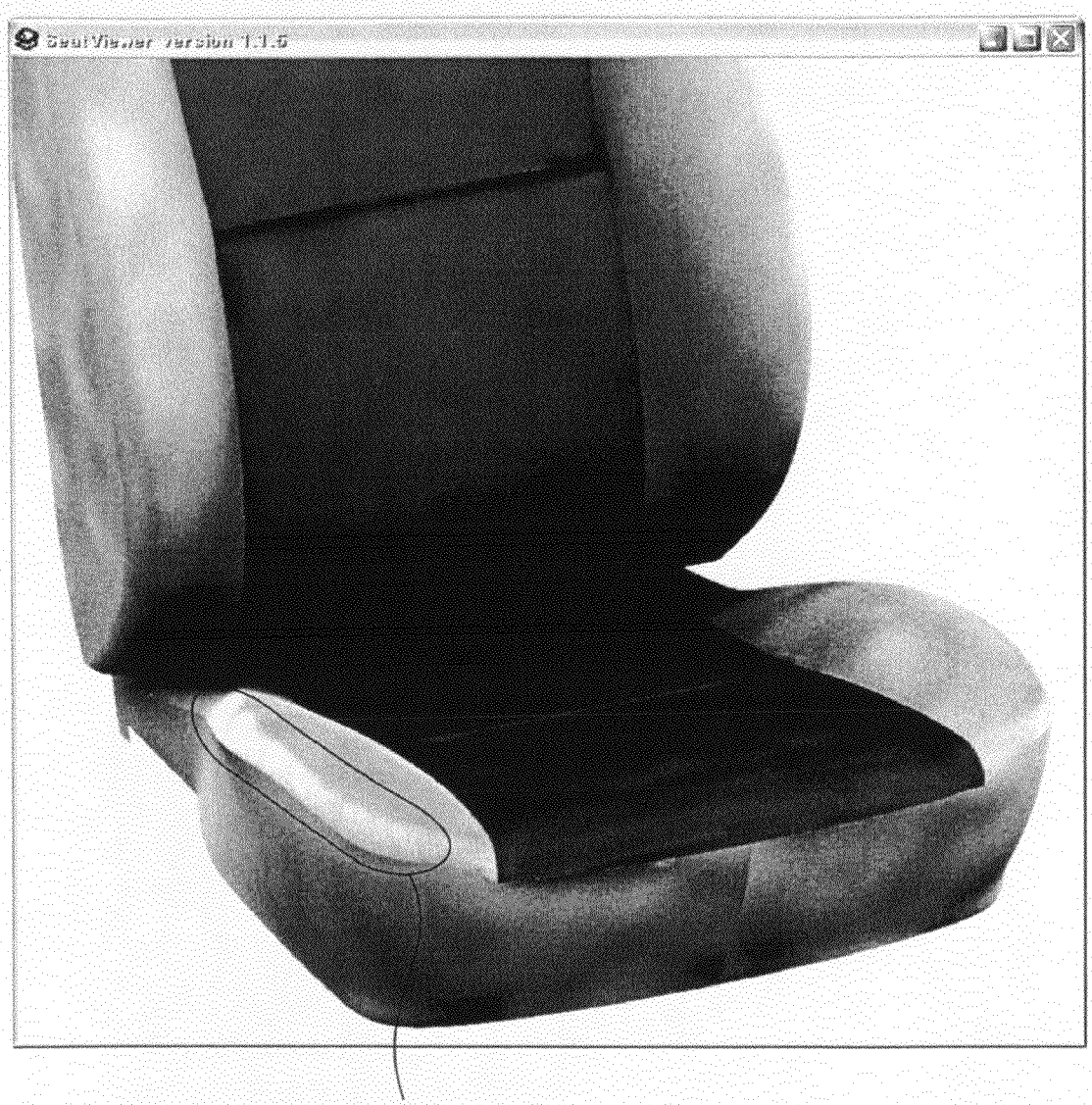
FIG. 17 is a cross-sectional view showing a result of rendering the car seat, the result being obtained when napped fibers are perturbed.

FIG. 17 is a cross-sectional view showing a result of rendering the car seat, the result being obtained when napped fibers are perturbed. For example, within a region enclosed by a closed curve in FIG. 17, it can be seen that the fibers are perturbed in a certain direction, and that the fabric subjected to the napping treatment is realistically reproduced on the surface of the car seat.

Figure 18B:
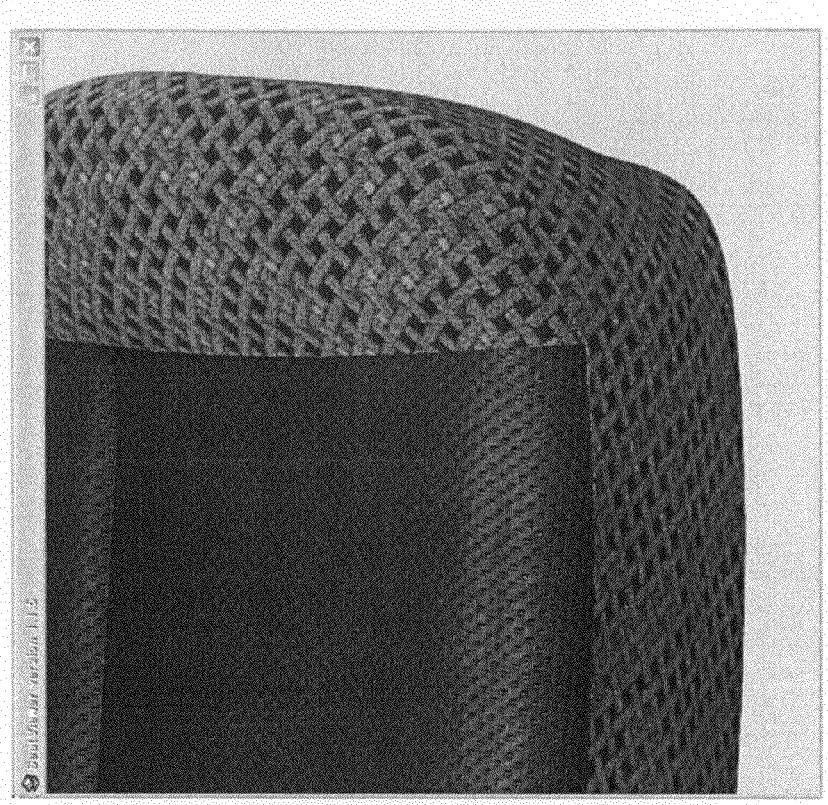
FIG. 18 is a diagram showing rendering results obtained when a patterned fabric is used as the texture, wherein (A) shows the case where the front section of the seating part of the car seat is viewed from above, and (B) shows the case where the front section of the seating part of the car seat is viewed from the front.
Figure 18A:
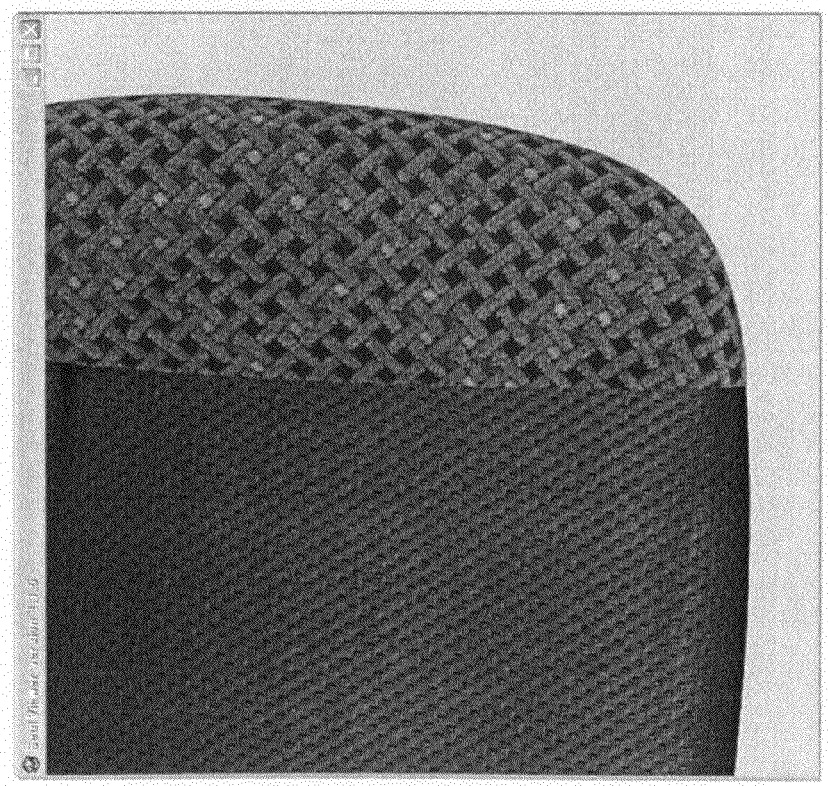

FIG. 18 is a diagram showing rendering results obtained when a patterned fabric is used as the texture, wherein (A) shows the case where the front section of the seating part of the car seat is viewed from above, and (B) shows the case where the front section of the seating part of the car seat is viewed from the front. In this case, a patterned fabric shown in FIG. 18 may be employed as the model of the texture. Specifically, for example, the color information represented by the color components of R, G and B may be provided to the texture information of each sample point C1 of the texture, and the rendering portion 107 may assign the color information to the value $C_{RGB}$ of Equation (7) to perform rendering.

As described above, according to the present rendering apparatus, the reflection property of the yarn can be acquired by measuring the reflected light of the actual yarn. The specular reflection coefficient $K_s$, the glossiness coefficient p, the first diffuse reflection coefficient $K_{d1}$, and the second diffuse reflection coefficient $K_{d2}$ can be calculated so that the error between the acquired reflection property and the energy of the reflected light obtained from the reflection function becomes minimum. The sterical model is rendered using the reflection function in which these coefficients are calculated. Therefore, the reflection function can express the reflection property of the real yarn realistically, and the sterical model surface can be displayed by a fabric in which the material thereof is reproduced realistically.

In addition, the reflection function has the first diffuse reflection component $I_{d1}$ representing the diffuse reflected light related to the fiber direction of the yarn of the fabric out of diffuse reflected light of the fabric, the second diffuse reflection component $I_{d2}$ representing the diffuse reflected light that is not related to the fiber direction of the yarn of the fabric, and the napped reflection coefficient W representing the energy of the reflected light scattered by the napped yarn T1. Therefore, the reflection function can realistically reproduce the fabric subjected to the napping treatment, and the fabric displayed on the surface of the sterical model can be reproduced realistically.

Furthermore, because the specular reflection coefficient $K_s$, and the first and second diffuse reflection coefficients $K_{d1}$, $K_{d2}$ are normalized such that the total of the distribution of the energy of the reflected light obtained from the reflection function becomes 1, the material of the fabric cam be expressed realistically even when an arbitrary color is adopted in the reflection function.

Moreover, because the specular reflection component $I_s$ has the shading correction coefficient S, the reduction of the specular reflected light that is caused by the light being unable to reach from the light source can be reproduced on the surface of the yarns configuring the fabric.

In addition, due to the provision of the color information acquisition portion 103, the color of the fabric on the sterical model surface can be changed to a color desired by the user.

In addition, due to the provision of the perturbation setting information acquisition portion 104, the fibers of the sterical model surface can be perturbed, and more real rendering can be realized.

The computer-readable recording medium which stores the rendering program according to the present invention is a rendering program for rendering a sterical model that is created beforehand within a virtual three-dimensional space, the program causing a computer to function as: a model acquisition portion for acquiring the sterical model; a texture acquisition portion for acquiring a texture of a fabric that has height information representing the shape of a surface of the fabric and fiber direction information representing a fiber direction of a yarn configuring the fabric, and is attached to a surface of the sterical model; a rendering portion for rendering the sterical model by using the texture and a reflection function expressing an energy of reflected light of the yarn that corresponds to a ray direction, an eye direction and the fiber direction represented by the fiber direction information, the directions being within the virtual three-dimensional space; a reflection property acquisition portion for acquiring a reflection property of an actual yarn that is obtained by changing the ray direction and the eye direction and measuring an energy of reflected light of the actual yarn; and a correction portion for correcting the reflection function so that an error between the reflection property acquired by the reflection property acquisition portion and the energy of the reflected light obtained from the reflection function becomes minimum, wherein the rendering portion renders the sterical model by using the reflection function corrected by the correction portion.

The rendering apparatus according to the present invention is a rendering apparatus for rendering a sterical model that is created beforehand within a virtual three-dimensional space, the apparatus having: a model acquisition portion for acquiring the sterical model; a texture acquisition portion for acquiring a texture of a fabric that has height information representing the shape of a surface of the fabric and fiber direction information representing a fiber direction of a yarn configuring the fabric, and is attached to a surface of the sterical model; a rendering portion for rendering the sterical model by using the texture and a reflection function expressing an energy of reflected light of the yarn that corresponds to a ray direction, an eye direction and the fiber direction information within the virtual three-dimensional space; a reflection property acquisition portion for acquiring a reflection property of an actual yarn that is obtained by changing the ray direction and the eye direction and measuring an energy of reflected light of the actual yarn; and a correction portion for correcting the reflection function so that an error between the reflection property acquired by the reflection property acquisition portion and the energy of the reflected light of the yarn obtained from the reflection function becomes minimum, wherein the rendering portion renders the sterical model by using the reflection function corrected by the correction portion.

The rendering method according to the present invention is a rendering method for rendering a sterical model that is created beforehand within a virtual three-dimensional space, the method having: a step in which a computer acquires the sterical model; a step in which the computer acquires a texture of a fabric that has height information representing the shape of a surface of the fabric and fiber direction information representing a fiber direction of a yarn configuring the fabric, and is attached to a surface of the sterical model; a step in which the computer renders the sterical model by using the texture and a reflection function expressing an energy of reflected light of the yarn that corresponds to a ray direction, an eye direction and the fiber direction information within the virtual three-dimensional space; a step in which the computer acquires a reflection property of an actual yarn that is obtained by changing the ray direction and the eye direction and measuring an energy of reflected light of the actual yarn; and a step in which the computer corrects the reflection function so that an error between the reflection property and the energy of the reflected light obtained from the reflection function becomes minimum, wherein the rendering step renders the sterical model by using the reflection function corrected.

According to these configurations, the reflection property of an actual yarn that is obtained by changing the ray direction and eye direction and measuring the reflected light of the yarn is acquired, the reflection function is corrected so that the error between the acquired reflection property and the energy of the reflected light obtained from the reflection function of the yarn becomes minimum, and the sterical model is rendered by using the corrected reflection function and the texture of the fabric. Consequently, the reflection function can realistically display the reflection property of the real yarn, whereby the surface of the sterical model can be displayed by the fabric in which the material thereof is reproduced realistically.

(2) It is preferred that the reflection function have a specular reflection component representing an energy of specular reflected light of the yarn, a first diffuse reflection component representing an energy of diffuse reflection light related to the fiber direction of the yarn, the diffuse reflection light being part of diffuse reflection light of the yarn, and a second diffuse reflection component representing an energy of diffuse reflection light that is not related to the fiber direction of the yarn, the diffuse reflection light being part of the diffuse reflection light of the yarn, that the specular reflection component have a variable part defined by the ray direction, the eye direction and the fiber direction, a specular reflection coefficient related to the variable part, and a glossiness coefficient representing the spread of a distribution of an energy of specular reflected light, that the first diffuse reflection component have a variable part defined by the ray direction and the fiber direction, and a first diffuse reflection coefficient related to the variable part, that the second diffuse reflection component have a variable part defined by the ray direction and a normal direction of the yarn, and a second diffuse reflection coefficient related to the variable part, and that the correction portion calculate at least any one coefficient of the specular reflection coefficient, the glossiness coefficient, the first diffuse reflection coefficient and the second diffuse reflection coefficient so that the error between the reflection property acquired by the reflection property acquisition portion and the energy of the reflected light obtained from the reflection function becomes minimum.

According to this configuration, because the reflection function has the first diffuse reflection component representing the diffuse reflected light out of the diffuse reflected light of the yarn, which is related to the fiber direction of the yarn, and the second diffuse reflection component representing the diffuse reflected light that is not related to the fiber direction of the yarn, the reflection function can reproduce the reflection property of the actual yarn more realistically, and the fabric displayed on the surface of the sterical model can be reproduced more realistically. In addition, because the specular reflection coefficient included in the specular reflection component, the glossiness coefficient, and the first and second diffuse reflection coefficients included in the first and second diffuse reflection components are calculated so that the error between the reflection property of the actual yarn and the energy of the reflected light obtained from the reflection function becomes minimum, the reflection function can reproduce the reflection property of the actual yarn more realistically.

(3) It is preferred that the correction portion normalize the specular reflection coefficient, the first diffuse reflection coefficient and the second diffuse reflection coefficient so that the total of a distribution of the energy of the reflected light obtained from the reflection function becomes equal to an incident energy.

According to this configuration, because the specular reflection coefficient and the first and second diffuse reflection coefficient are normalized, the reflection function can display the material of the fabric realistically, even when an arbitrary color is adopted in the reflection function.

(4) It is preferred that the texture have fiber density information representing the density of fibers configuring a yarn subjected to a napping treatment, and that the reflection function further have a napped reflection component for calculating, based on the fiber density information, an energy of reflected light scattered by the fibers configuring the yarn subjected to the napping treatment.

According to this configuration, because the reflection function has the napped reflection component, a fabric subjected to the napping treatment can be reproduced realistically on the surface of the sterical model.

(5) It is preferred that the rendering portion correct the glossiness coefficient such that a distribution of the energy of the specular reflected light spreads out more in a section where the fiber density information is lower.

According to this configuration, because the glossiness coefficient is corrected such that the distribution of the energy of the specular reflected light spread out more in a section where the fiber density information is lower, the fabric subjected to the napping treatment can be reproduced more realistically on the surface of the sterical model.

(6) It is preferred that the specular reflection component further have a shading correction coefficient for reproducing a reduction of the energy of the specular reflected light, which is caused by the presence of a shading region that light from a light source does not reach, and that the rendering portion perform rendering by using the specular reflection component having the shading correction coefficient.

According to this configuration, because the specular reflection component has the shading correction coefficient, the reduction of the specular reflected light that is caused by the light being unable to reach from the light source can be reproduced on the surface of the fibers configuring the yarn.

(7) It is preferred that the rendering program further have color information acquisition portion for acquiring color information for specifying a color of the sterical model, and that the rendering portion render the sterical model by using the color information acquired by the color information acquisition portion.

According to this configuration, the color of the fabric on the surface of the sterical model can be changed to a color desired by the user.

(8) It is preferred that the rendering program further have perturbation setting information acquisition portion for acquiring perturbation setting information for applying a bias to the direction of the fibers subjected to the napping treatment, to perturb the fibers, and that, when the perturbation setting information is acquired, the rendering apply a predetermined bias to the direction of the fibers subjected to the napping treatment, in a predetermined region of the sterical model surface.

According to this configuration, because the predetermined bias is applied to the direction of the fibers subjected to the napping treatment in the predetermined region of the sterical model surface, and the fibers are perturbed, more realistic rendering can be realized.

The invention claimed is:

1. A non-transitory computer-readable recording medium which stores a rendering program for rendering a sterical model that is created beforehand in a virtual three-dimensional space, the program causing a computer to function as:
   a model acquisition portion for acquiring the sterical model of a certain object that is created beforehand within a virtual three-dimensional space by using modeling software;
   a texture acquisition portion for acquiring a texture of a fabric which has height information representing the shape of a surface of the fabric and fiber direction information indicating a fiber direction of a yarn configuring the fabric, and which is attached to a surface of the sterical model;
   a rendering portion for rendering the sterical model by using the texture and a reflection function expressing an energy of reflected light of the yarn that corresponds to a ray direction, an eye direction and the fiber direction represented by the fiber direction information, the directions being in the virtual three-dimensional space;
   a reflection property acquisition portion for acquiring a reflection property of an actual yarn that is obtained by measuring an energy of reflected light of the actual yarn after changing the ray direction and the eye direction and; and
   a correction portion for correcting the reflection function so that an error between the reflection property acquired by the reflection property acquisition portion and the energy of the reflected light obtained from the reflection function becomes minimum, wherein
   the rendering portion renders the sterical model by using the reflection function corrected by the correction portion,
   the reflection function includes specular reflection component representing an energy of specular reflected light of the yarn, a first diffuse reflection component representing an energy of diffuse reflection light, which is taken into account for the fiber direction of the yarn, of the diffuse reflection light of the yarn, and a second diffuse reflection component representing an energy of diffuse reflection light, which is not taken into account for the fiber direction of the yarn, of the diffuse reflection light of the yarn,
   the specular reflection component includes a variable part defined by the ray direction, the eye direction and the fiber direction, a specular reflection coefficient related to the variable part, and a glossiness coefficient representing a spread of a distribution of an energy of specular reflected light,
   the first diffuse reflection component includes a variable part defined by the ray direction and the fiber direction, and a first diffuse reflection coefficient related to the variable part,
   the second diffuse reflection component includes a variable part defined by the ray direction and a normal direction of the yarn, and a second diffuse reflection coefficient related to the variable part, and wherein
   the correction portion calculates at least any one coefficient of the specular reflection coefficient, the glossiness coefficient, the first diffuse reflection coefficient and the second diffuse reflection coefficient so that the error between the reflection property acquired by the reflection property acquisition portion and the energy of the reflected light obtained from the reflection function becomes minimum,
   the texture has fiber density information representing the density of fibers configuring a yarn subjected to a napping treatment,
   the rendering portion corrects the glossiness coefficient such that a distribution of the energy of the specular reflected light spreads out more in a section where the fiber density information is less available, and
   the rendering portion corrects the glossiness coefficient p by using an equation: $p'=p \cdot d^2$ where the value p represents the glossiness coefficient of the specular reflection component, the value p' represents the corrected glossiness coefficient and the value d represents the fiber density information.

2. The non-transitory computer-readable recording medium according to claim 1, wherein the correction portion standardizes the specular reflection coefficient, the first diffuse reflection coefficient and the second diffuse reflection coefficient so that the total of a distribution of the energy of the reflected light obtained from the reflection function becomes equal to an incident energy.

3. The non-transitory computer-readable recording medium according to claim 1, wherein
   the reflection function further has a napped reflection component for calculating, based on the fiber density information, an energy of reflected light scattered by the fibers configuring the yarn subjected to the napping treatment.

4. The non-transitory computer-readable recording medium according to claim 1, wherein
   the specular reflection component further has a shading correction coefficient for reproducing a reduction in the energy of the specular reflected light, which is caused by the presence of a shading region that light from a light source does not reach on the surface of the fiber configuring the yarn, and
   the rendering portion performs rendering by using the specular reflection component having the shading correction coefficient.

5. The non-transitory computer-readable recording medium according to claim 1, further comprising color information acquisition portion for acquiring color information for specifying a color of the sterical model, wherein
   the rendering portion renders the sterical model by using the color information acquired by the color information acquisition portion.

6. The non-transitory computer-readable recording medium according to claim 3, further comprising perturbation setting information acquisition portion for acquiring perturbation setting information for applying a bias to the direction of the fibers subjected to the napping treatment, to perturb the fibers, wherein
   when the perturbation setting information is acquired, the rendering portion applies a predetermined bias to the direction of the fibers subjected to the napping treatment, in a predetermined region of the sterical model surface.

7. A rendering apparatus including a computer for rendering a sterical model that is created beforehand in a virtual three-dimensional space, the apparatus comprising:
- a model acquisition portion for acquiring a sterical model of a certain object that is created beforehand within a virtual three-dimensional space by using modeling software;
- a texture acquisition portion for acquiring a texture of a fabric which includes height information representing the shape of a surface of the fabric and fiber direction information indicating a fiber direction of a yarn configuring the fabric, and which is attached to a surface of the sterical model;
- a rendering portion for rendering the sterical model by using the texture and a reflection function expressing an energy of reflected light of the yarn that corresponds to a ray direction, an eye direction and the fiber direction information in the virtual three-dimensional space;
- a reflection property acquisition portion for acquiring a reflection property of an actual yarn that is obtained by measuring an energy of reflected light of the actual yarn after changing the ray direction and the eye direction; and
- a correction portion for correcting the reflection function so that an error between the reflection property acquired by the reflection property acquisition portion and the energy of the reflected light of the yarn obtained from the reflection function becomes minimum, wherein
- the rendering portion renders the sterical model by using the reflection function corrected by the correction portion,
- the reflection function includes specular reflection component representing an energy of specular reflected light of the yarn, a first diffuse reflection component representing an energy of diffuse reflection light, which is taken into account for the fiber direction of the yarn, of the diffuse reflection light of the yarn, and a second diffuse reflection component representing an energy of diffuse reflection light, which is not taken into account for the fiber direction of the yarn, of the diffuse reflection light of the yarn,
- the specular reflection component includes a variable part defined by the ray direction, the eye direction and the fiber direction, a specular reflection coefficient related to the variable part, and a glossiness coefficient representing a spread of a distribution of an energy of specular reflected light,
- the first diffuse reflection component includes a variable part defined by the ray direction and the fiber direction, and a first diffuse reflection coefficient related to the variable part,
- the second diffuse reflection component includes a variable part defined by the ray direction and a normal direction of the yarn, and a second diffuse reflection coefficient related to the variable part, and wherein
- the correction portion calculates at least any one coefficient of the specular reflection coefficient, the glossiness coefficient, the first diffuse reflection coefficient and the second diffuse reflection coefficient so that the error between the reflection property acquired by the reflection property acquisition portion and the energy of the reflected light obtained from the reflection function becomes minimum,
- the texture has fiber density information representing the density of fibers configuring a yarn subjected to a napping treatment,
- the rendering portion corrects the glossiness coefficient such that a distribution of the energy of the specular reflected light spreads out more in a section where the fiber density information is less available, and
- the rendering portion corrects the glossiness coefficient p by using equation: $p'=p \cdot d^2$ where the value p represents the glossiness coefficient of the specular reflection component, the value p' represents the corrected glossiness coefficient and the value d represents the fiber density information.

8. A rendering method for rendering a sterical model that is created beforehand in a virtual three-dimensional space, the method comprising:
- a step in which a computer acquires a sterical model of a certain object that is created beforehand within a virtual three-dimensional space by using modeling software;
- a step in which the computer acquires a texture of a fabric which includes height information representing the shape of a surface of the fabric and fiber direction information indicating a fiber direction of a yarn configuring the fabric, and which is attached to a surface of the sterical model;
- a step in which the computer renders the sterical model by using the texture and a reflection function expressing an energy of reflected light of the yarn that corresponds to a ray direction, an eye direction and the fiber direction information in the virtual three-dimensional space;
- a step in which the computer acquires a reflection property of an actual yarn that is obtained by measuring an energy of reflected light of the actual yarn after changing the ray direction and the eye direction and; and
- a step in which the computer corrects the reflection function so that an error between the reflection property and the energy of the reflected light obtained from the reflection function becomes minimum, wherein
- the rendering step renders the sterical model by using the reflection function corrected,
- the reflection function includes specular reflection component representing an energy of specular reflected light of the yarn, a first diffuse reflection component representing an energy of diffuse reflection light, which is taken into account for the fiber direction of the yarn, of the diffuse reflection light of the yarn, and a second diffuse reflection component representing an energy of diffuse reflection light, which is not taken into account for the fiber direction of the yarn, of the diffuse reflection light of the yarn,
- the specular reflection component includes a variable part defined by the ray direction, the eye direction and the fiber direction, a specular reflection coefficient related to the variable part, and a glossiness coefficient representing a spread of a distribution of an energy of specular reflected light,
- the first diffuse reflection component includes a variable part defined by the ray direction and the fiber direction, and a first diffuse reflection coefficient related to the variable part,
- the second diffuse reflection component includes a variable part defined by the ray direction and a normal direction of the yarn, and a second diffuse reflection coefficient related to the variable part, and wherein
- the step in which the computer corrects the reflection function comprises a step in which the computer calculates the specular reflection coefficient, the glossiness coefficient, the first diffuse reflection coefficient and the second diffuse reflection coefficient so that the error between the reflection property acquired by the reflection property acquisition portion and the energy of the reflected light obtained from the reflection function becomes minimum, the texture has fiber density information representing the density of fibers configuring a yarn subjected to a napping treatment, in the rendering step, the glossiness coefficient is corrected such that a distribution of the energy of the specular reflected light spreads out more in a section where the fiber density information is less available, and in the rendering step, the glossiness coefficient p is corrected by using an equation: $p'=p \cdot d^2$ where the value p represents the glossiness coefficient of the specular reflection component, the value p' represents the corrected glossiness coefficient and the value d represents the fiber density information.

* * * * *